(12) United States Patent
Sato

(10) Patent No.: US 6,683,750 B2
(45) Date of Patent: Jan. 27, 2004

(54) THIN FILM MAGNETIC HEAD COMPRISING INSULATING LAYER PROVIDED BETWEEN CORE AND COIL

(75) Inventor: Kiyoshi Sato, Niigata-ken (JP)

(73) Assignee: Alps Electric Co., Ltd., Toyko (JP)

( * ) Notice: Subject to any disclaimer, the term of this patent is extended or adjusted under 35 U.S.C. 154(b) by 366 days.

(21) Appl. No.: 09/761,350

(22) Filed: Jan. 16, 2001

(65) Prior Publication Data

US 2001/0009488 A1 Jul. 26, 2001

(30) Foreign Application Priority Data

Jan. 24, 2000 (JP) ........................................ 2000-014571

(51) Int. Cl.[7] .............................................. G11B 5/147
(52) U.S. Cl. ...................................... 360/126; 360/123
(58) Field of Search .................................. 360/123, 126

(56) References Cited

U.S. PATENT DOCUMENTS

| 5,452,164 | A | 9/1995 | Cole et al. |
| 5,649,351 | A | 7/1997 | Cole et al. |
| 5,652,687 | A | 7/1997 | Chen et al. |
| 5,802,700 | A | 9/1998 | Chen et al. |
| 6,477,004 | B2 * | 11/2002 | Sasaki .................. 360/123 |
| 6,483,665 | B1 * | 11/2002 | Sasaki .................. 360/126 |
| 6,510,024 | B2 * | 1/2003 | Otsuka et al. .......... 360/126 |

* cited by examiner

Primary Examiner—Robert S. Tupper
(74) Attorney, Agent, or Firm—Brinks Hofer Gilson & Lione

(57) ABSTRACT

An inorganic insulation underlying layer and an organic insulation underlying layer are formed on a lower core layer behind a recording region. Also, a coil layer is formed on the organic insulation underlying layer. Therefore, the withstand voltage between the lower core layer and the coil layer can be improved.

38 Claims, 20 Drawing Sheets

THIN FILM MAGNETIC HEAD COMPRISING INSULATING LAYER PROVIDED BETWEEN CORE AND COIL

BACKGROUND OF THE INVENTION

1. Field of the Invention

The present invention relates to a recording thin film magnetic head used as, for example, a flying magnetic head, or the like, and particularly, to a thin film magnetic head in which the magnetic path can be shortened to decrease inductance, and withstand voltage between a lower core layer and a coil layer can be improved, and a manufacturing method therefor.

2. Description of the Related Art

FIG. 36 is a partial longitudinal sectional view showing the structure of a conventional thin film magnetic head (inductive head).

In FIG. 36, reference numeral 1 denotes a lower core layer made of a magnetic material such as permalloy, or the like, and a recording region 12 is formed on the lower core layer 1 near the surface facing a recording medium.

The recording region 12 comprises, for example, a gap layer 4 and an upper pole layer 4 made of a magnetic material.

In addition, a coil layer 5 is formed on the rear region of the upper core layer 1, which is behind the recording region in the height direction (the Y direction shown in FIG. 36).

Furthermore, the pitch intervals of a conductor of the coil layer 5 is filled with an insulation layer 11, and an insulation layer 7 made of an organic material or the like is formed on the coil layer 5 and the insulation layer 11.

As shown in FIG. 36, an upper core layer 8 made of permalloy or the like is formed in the region from the recording region 12 to the insulation layer 7 so that the front end 8a of the upper core layer 8 is magnetically connected to the upper top pole layer 4, and the base end 8b is magnetically connected to the lower core layer 1. As shown in FIG. 36, the front end of the upper core layer 8 may be formed at a position shifted backward from the surface facing the recording medium, or exposed from the surface facing the recording medium.

This thin film magnetic head has a construction in which the coil layer 5 is provided behind the recording region 12 in the height direction so that the magnetic path ranging from the upper core layer 8 to the lower core layer 1 can be shortened to decrease inductance, thereby making adaptable to a higher recording density in future.

As shown in FIG. 36, an insulation underlying layer 9 is formed between the coil layer 5 and the lower core layer 1 to maintain electric insulation between the coil layer 5 and the lower core layer 1.

However, the thin film magnetic head shown in FIG. 36 causes the following problems.

Since the coil layer 5 must be formed behind the recording region 12 in the height direction (the Y direction shown in FIG. 36), the insulation underlying layer 9 must be thinly formed between the coil layer 5 and the lower core layer 1, thereby failing to sufficiently maintain withstand voltage between the coil layer 5 and the lower core layer 1.

The insulation underlying layer 9 is thinly formed by sputtering using an inorganic insulating material, for example, such as $Al_2O_3$, or the like.

However, in depositing the thin film by sputtering, the insulation underlying layer 9 is easily contaminated with dust particles (impurities) present in a sputtering apparatus to decrease the withstand voltage of the insulation underlying layer 9.

Also, in forming the thin insulation underlying layer 9 by sputtering, pinholes or the like easily occur in the insulation underlying layer 9, thereby further decreasing the withstand voltage.

Conversely, when the thick insulation underlying layer 9 is formed to a thickness sufficient to secure the withstand voltage between the lower core layer 1 and the coil layer 5, and the coil layer 5 is formed so that the upper surfaces of the coil layer 5 and the recording region 12 lie in substantially the same plane, as shown in FIG. 36, the coil layer 5 is thinned, and thus the width dimension T1 of the coil layer 5 must be increased from the viewpoint of decreasing the coil resistance value. Therefore, the magnetic path ranging from the upper core layer 8 to the lower core layer 1 is lengthened to increase inductance, thereby failing to manufacture a thin film magnetic head adaptable to a higher recording density.

Even when the thick insulation underlying layer 9 is formed, the withstand voltage of the insulation underlying layer 9 cannot be effectively improved due to the above-described contamination with dust particles during sputtering.

SUMMARY OF THE INVENTION

The present invention has been achieved for solving the above-described problems of a conventional magnetic head, and an object of the present invention is to provide a thin film magnetic head in which the magnetic path can be shortened to decrease inductance, and the withstand voltage between a coil layer and a lower core layer can be improved, and a manufacturing method therefor.

In order to achieve the object, the present invention provides a thin film magnetic head comprising a lower core layer, an upper core layer, a recording region comprising a pole layer and a gap layer located between the lower and upper core layers in the surface facing a recording medium, and a coil layer formed on the rear portion of the lower core layer, which is behind the recording region in the height direction, for inducing a recording magnetic field in the lower core layer, the upper core layer and the recording region, wherein at least an organic insulation underlying layer is interposed between the lower core layer and the coil layer.

In the present invention, the organic insulation underlying layer made of an organic material having high withstand voltage is formed between the lower core layer and the coil layer, thereby effectively improving the withstand voltage between the lower core layer and the coil layer.

Even with the thin organic insulation underlying layer, pinholes less occur to permit the formation of the thin insulation underlying layer having high withstand voltage, as compared with a conventional insulation underlying layer made of an inorganic insulating material.

More specifically, in the present invention, an inorganic insulation underlying layer is formed on the lower core layer, the organic insulation underlying layer is formed on the inorganic insulation underlying layer, and the coil layer is formed on the organic insulation underlying layer.

Alternatively, the organic insulation underlying layer is formed on the lower core layer, the inorganic insulation underlying layer is formed on the organic insulation underlying layer, and the coil layer is formed on the inorganic insulation underlying layer.

Namely, the insulation underlying layer comprising the two layers, i.e., the organic insulation underlying layer and the inorganic insulation underlying layer, is formed between the lower core layer and the coil layer. This can appropriately improve the withstand voltage between the lower core layer and the coil layer, as compared with the conventional insulation underlying layer comprising a single layer.

Where the inorganic insulation underlying layer is a lower layer, and the organic insulation underlying layer is an upper layer, the pinholes formed in the inorganic insulation underlying layer are appropriately filled with the organic insulation underlying layer to effectively improve the withstand voltage.

In the present invention, the inorganic insulation underlying layer is preferably made of at least one inorganic insulating material of AlO, $Al_2O_3$, $SiO_2$, $Ta_2O_3$, TiO, AlN, AlSiN, TiN, SiN, $Si_3N_4$, NiO, WO, $WO_3$, BN, CrN, SiON, and AlSiO.

The organic insulation underlying layer is preferably made of resist or polyimide.

In the present invention, the thickness of the inorganic insulation underlying layer is preferably in the range of 0.15 $\mu$m to 0.5 $\mu$m.

The thickness of the organic insulation underlying layer is preferably in the range of 0.2 $\mu$m to 1.0 $\mu$m.

Furthermore, in the present invention, the gap between the lower core layer and the coil layer is preferably in the range of 0.35 $\mu$m to 1.5 $\mu$m. With the large gap between the lower core layer and the coil layer, i.e., the thick organic insulation underlying layer or the thick insulation underlying layer comprising the two layers including the organic insulation underlying layer and the inorganic insulation underlying layer, the coil layer must be thinly formed on the insulation underlying layer. In this case, the width dimension of the coil layer must be increased from the viewpoint of decreasing the coil resistance value, and thus the magnetic path ranging from the lower core layer to the upper core layer is lengthened to increase inductance, thereby failing to manufacture a thin film magnetic head adaptable to a future higher recording density.

In the present invention, therefore, the gap between the lower core layer and the coil layer is set to a small value in the above range to permit the formation of the coil layer having a thickness in the same level as a conventional layer, and thus the magnetic path can be shortened to permit the formation of a thin film magnetic head adaptable to a higher recording density.

The gap between the lower core layer and the coil layer has a thickness corresponding to the conventional insulation underlying layer comprising a single layer of an inorganic insulating material.

In the present invention, the pitch intervals of the conductor which constitutes the coil layer may be filled with a coil insulation layer, or coil forming grooves of the coil insulation layer, which is formed on the rear portion of the lower core layer behind the recording region in the height direction, may be filled with the coil layer.

In this case, the upper surface of the coil insulation layer and the upper surface of the coil layer preferably lie in the same plane.

In addition, the upper surfaces of the coil insulation layer and the coil layer are preferably polished.

Furthermore, assuming that the junction plane between the recording region and the upper core layer is a reference plane, the upper surfaces of the coil insulation layer and the coil layer are preferably located in the same plane as the reference plane.

In the present invention, the coil insulation layer is preferably made of an inorganic insulating material.

In the present invention, preferably, an insulation layer is formed on the coil layer, and a second coil layer is formed on the insulation layer so as to be electrically connected to the coil layer, for inducing a recording magnetic field in the lower core layer, the upper core layer and the recording region. This can more effectively realize the short magnetic path ranging from the lower core layer to the upper core layer, thereby permitting the manufacture of a thin film magnetic head adaptable to a higher recording density in future.

In the present invention, the recording region preferably comprises a lower pole layer connected directly to the lower core layer, and a gap layer formed on the lower pole layer, an upper pole layer formed on the lower core layer with a gap layer provided therebetween to be connected directly to the upper core layer, or a lower pole layer connected directly to the lower core layer, and an upper pole layer formed on the lower core layer with a gap layer provided therebetween to be connected directly to the upper core layer.

In this case, the gap layer is preferably made of a nonmagnetic metal material which can be plated.

As the nonmagnetic metal material, at least one material is preferably selected from NiP, NiPd, NiW, NiMo, Au, Pt, Rh, Pd, Ru, Cr, and NiCu.

In the present invention, the recording region may comprise a gap layer formed on the lower core layer, and an upper pole layer formed on the gap layer, or a gap layer which is formed on a protrusion formed integrally with the lower core layer to project toward the upper core layer, and an upper pole layer formed on the gap layer.

In this case, the gap layer is preferably made of an inorganic insulating material. As the inorganic insulating material, at least one material is preferably selected from $Al_2O_3$, $SiO_2$, SiON, AlN, AlSiN, and AlSiO.

A method of manufacturing a thin film magnetic head of the present invention comprises:

(a) the step of forming a recording region comprising a pole layer and a gap layer on a lower core layer;

(b) the step of forming an organic insulation underlying layer on the portion of the lower core layer, which is behind the recording region in the height direction;

(c) the step of forming a coil layer and a coil insulation layer on the organic insulation underlying layer so that the coil insulation layer is contained in the pitch intervals of a conductor of the coil layer; and (d) the step of forming an insulation layer on the coil layer and the coil insulation layer, and then forming an upper core layer on the insulation layer.

In the present invention, after the recording region is formed on the lower core layer, the organic insulation underlying layer can be formed on the portion of the lower core layer, which is behind the recording region in the height direction. The organic insulation underlying layer has higher withstand voltage than an inorganic insulation underlying layer.

In the present invention, the coil layer is formed on the organic insulation underlying layer to appropriately improve the withstand voltage between the lower core layer and the coil layer, as compared with a conventional inorganic insulation underlying layer comprising a single layer.

Particularly, even when the insulation underlying layer made of the organic insulating material is thin, pinholes less occur, thereby facilitating the formation of the thin organic insulation underlying layer. Therefore, the coil layer formed on the organic insulation underlying layer can be made thin to realize the short magnetic path, permitting the manufacture of a thin film magnetic head adaptable to a higher recording density.

The present invention may comprise the following steps in place the above step (b).

(e) The step of forming an inorganic insulation underlying layer in the region from the recording region to the lower core layer; and (f) The step of forming an organic insulation underlying layer on the inorganic insulation underlying layer formed on the lower core layer.

Alternatively, the present invention may comprise the following steps in place of the step (c).

(g) The step of forming an inorganic insulation underlying layer in the region raging from the recording region to the organic insulation underlying layer; and (h) The step of forming a coil insulation layer on the inorganic insulation underlying layer to insert the coil insulation layer in the pitch intervals of a conductor of the coil layer.

Namely, in this case, not only the organic insulation underlying layer but also the inorganic insulation underlying layer are formed between the lower core layer and the coil layer.

The two-layer structure comprising the inorganic insulation underlying layer and the organic insulation underlying layer can further improve the withstand voltage, as compared with the single-layer structure of the conventional inorganic insulation layer.

When the organic insulation underlying layer is laminated on the inorganic insulation underlying layer, the organic insulation underlying layer has the function to fill the pinholes formed in the inorganic insulation underlying layer, appropriately improving the withstand voltage.

In the present invention, the inorganic insulation underlying layer is preferably made of at least one inorganic insulating material selected from AlO, $Al_2O_3$, $SiO_2$, $Ta_2O_5$, TiO, AlN, AlSiN, TiN, SiN, $Si_3N_4$, NiO, WO, $WO_3$, BN, CrN, SiON, and AlSiO.

The organic insulation underlying layer is preferably made of resist or polyimide.

In the above step (c) or (h), after the coil insulation layer is formed on the organic insulating underlying layer or the inorganic insulation underlying layer, coil forming grooves are preferably formed in the coil insulation layer so that the coil forming grooves are filled with a conductive material to form the coil layer.

Alternatively, in the step (c) or (h), after the coil layer is formed on the organic insulating underlying layer or the inorganic insulation underlying layer, the pitch intervals of the conductor of the coil layer are preferably filled with the coil insulation layer.

In another aspect of the present invention, there is provided a method of manufacturing a thin film magnetic head comprising:

(i) the step of forming an organic insulation underlying layer at a predetermined position on a lower core layer;

(j) the step of forming a coil insulation layer on the lower core layer and the organic insulation underlying layer;

(k) the step of forming a trench within a predetermined length from the surface of the coil insulating layer facing a recording medium in the height direction, and forming a recording region comprising a gap layer and a magnetic layer in the trench;

(l) the step of forming coil forming grooves in the coil insulation layer on the organic insulation underlying layer, and filling the coil forming grooves with a conductive material to form a coil layer; and (m) the step of forming an insulation layer on the coil layer and the coil insulation layer and then forming an upper core layer on the insulation layer.

In the present invention, the organic insulation underlying layer is first formed on the lower core layer, the coil insulation layer and the recording region are then formed, and the coil layer is further formed.

In the above-described manufacturing method, the organic insulation underlying layer is formed to appropriately improve the withstand voltage between the lower core layer and the coil layer, and the organic insulation underlying layer can be used as a stopper layer in forming the coil forming grooves in the coil insulation layer in the step (1), permitting the proper formation of the coil layer on the organic insulation underlying layer.

The present invention may comprise the following steps in place the above step (j).

(n) The step of forming an inorganic insulation underlying layer on the organic insulation underlying layer and the lower core layer; and (o) The step of forming a coil insulation layer on the inorganic insulation underlying layer.

Alternatively, the present invention may comprise the following steps in place of the steps (i) and (j)).

(p) The step of forming an inorganic insulation underlying layer on the lower core layer;

(q) The step of forming an organic insulation underlying layer at a predetermined position on the inorganic insulation underlying layer; and (r) The step of forming a coil insulation layer on the inorganic insulation underlying layer and the organic insulation underlying layer.

Namely, in this case, not only the organic insulation underlying layer but also the inorganic insulation underlying layer are formed to form a two-layer structure insulation underlying layer.

In the present invention, in the step (a) or (k), the recording region preferably comprises a lower pole layer and a gap layer, a gap layer and an upper pole layer, or a lower pole layer, a gap layer and an upper pole layer.

In this case, the gap layer is preferably made of a nonmagnetic metal material which can be plated together with the pole layers. As the nonmagnetic metal material, at least one material is preferably selected from NiP, NiPd, NiW, NiMo, Au, Pt, Rh, Pd, Ru, Cr, and NiCu.

In the present invention, in the step (a), the recording region may comprise a gap layer and an upper pole layer, or after the recording region is formed, a protrusion may be formed integrally with the lower core layer by grinding both sides of the recording region and the surface of the lower core layer to project from the lower core layer toward the recording region and continue from the recording region.

In this case, the gap layer is preferably made of an inorganic insulating material. As the inorganic insulating material, at least one material is preferably selected from $Al_2O_3$, $SiO_2$, SiON, AlN, AlSiN, and AlSiO.

In the present invention, in the step (c), (h) or (l), after the coil layer and the coil insulation layer are formed, the upper surfaces of the coil layer and the coil insulation layer are preferably ground so that assuming that the upper surface of the recording region is a reference plane, the upper surfaces of the coil insulation layer and the coil layer lie in substantially the same plane as the reference plane.

In the present invention, the coil insulation layer is preferably made of an inorganic insulating material.

Also, in the step (d) or (m), after the insulation layer is formed on the coil layer and the coil insulation layer, a second coil layer is preferably formed on the insulation layer so as to be electrically connected to the coil layer, and the upper core layer is then formed on the second coil layer with an insulation layer provided therebetween. This can realize the shorter magnetic path to decrease inductance, thereby permitting the manufacture of a thin film magnetic head adaptable to a higher recording density in future.

DESCRIPTION OF THE PREFERRED EMBODIMENTS

Figure 1:
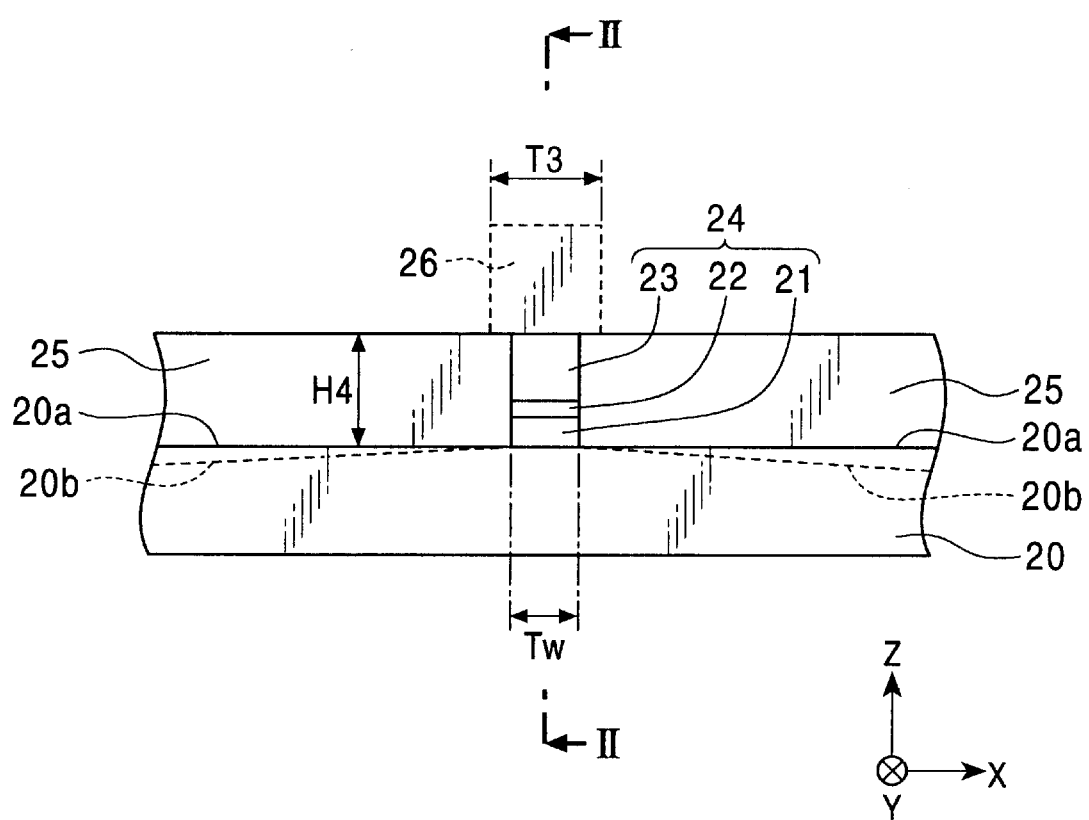
FIG. 1 is a partial front view showing the structure of a thin film magnetic head in accordance with an embodiment of the present invention.
Figure 2:
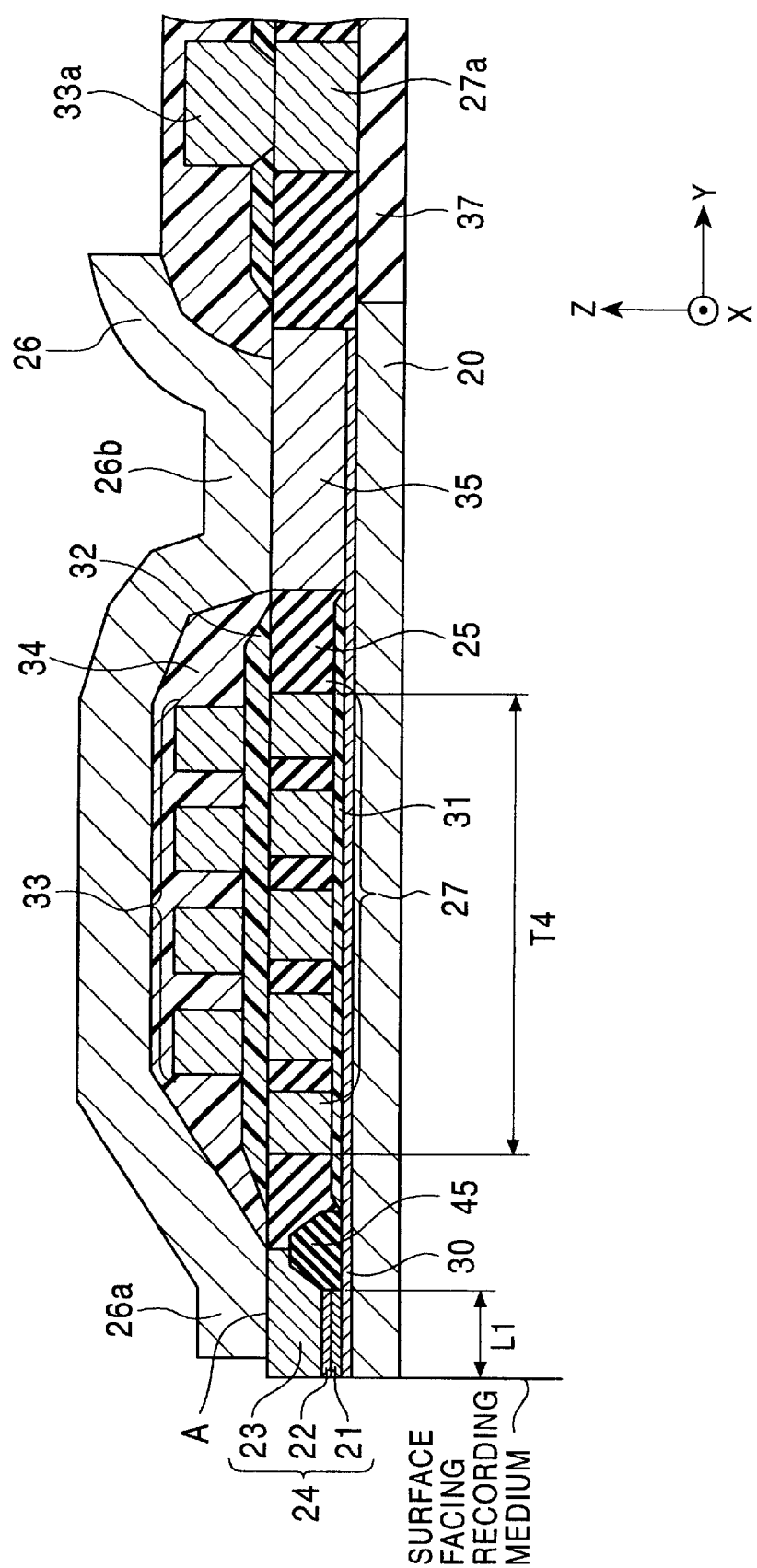
FIG. 2 is a partial sectional view of the thin film magnetic head shown in FIG. 1 taken along line II—II in FIG. 1.
Figure 3:
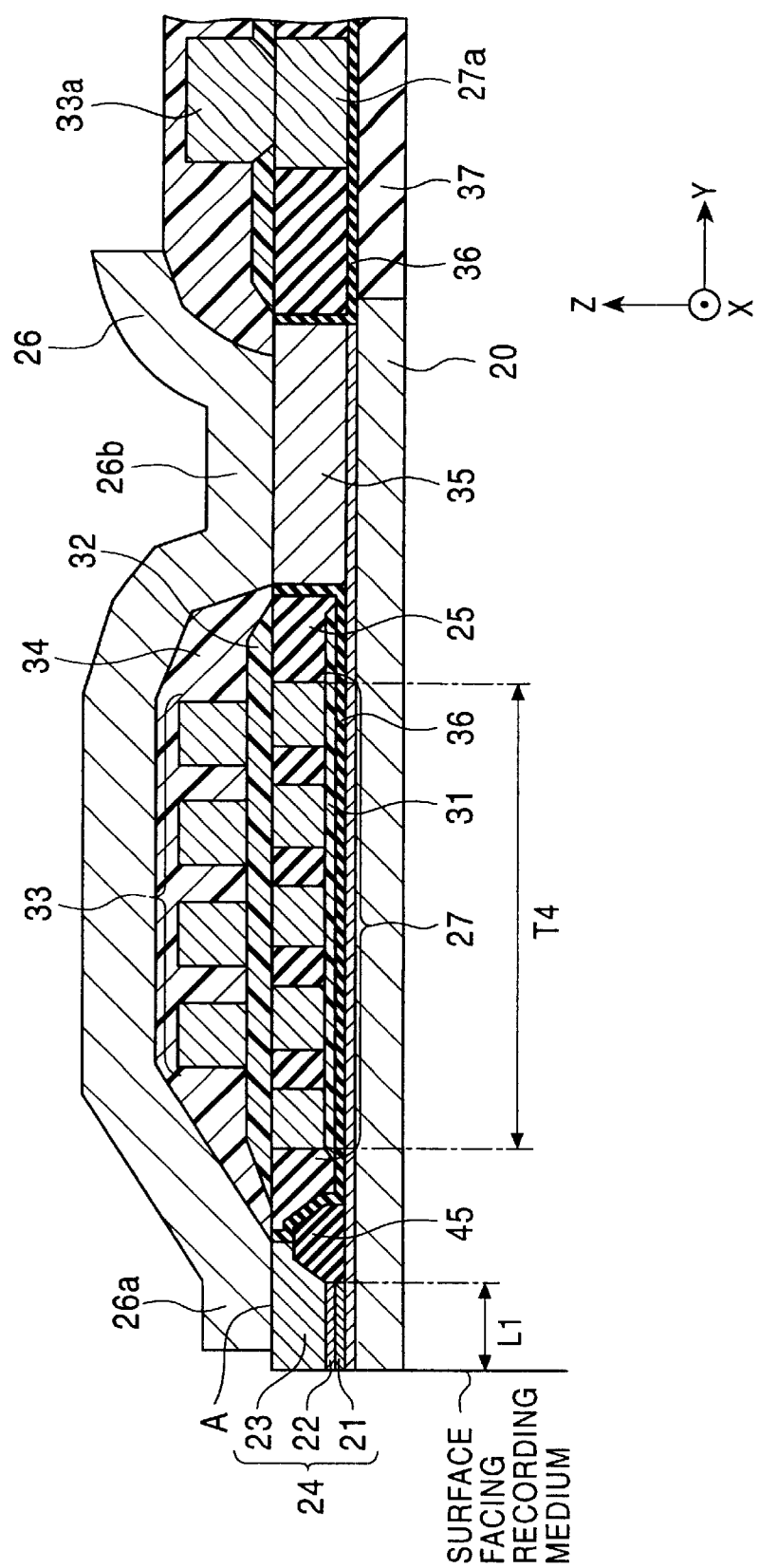
FIG. 3 is a partial sectional view showing the structure of a thin film magnetic head in accordance with another embodiment of the present invention.
Figure 4:
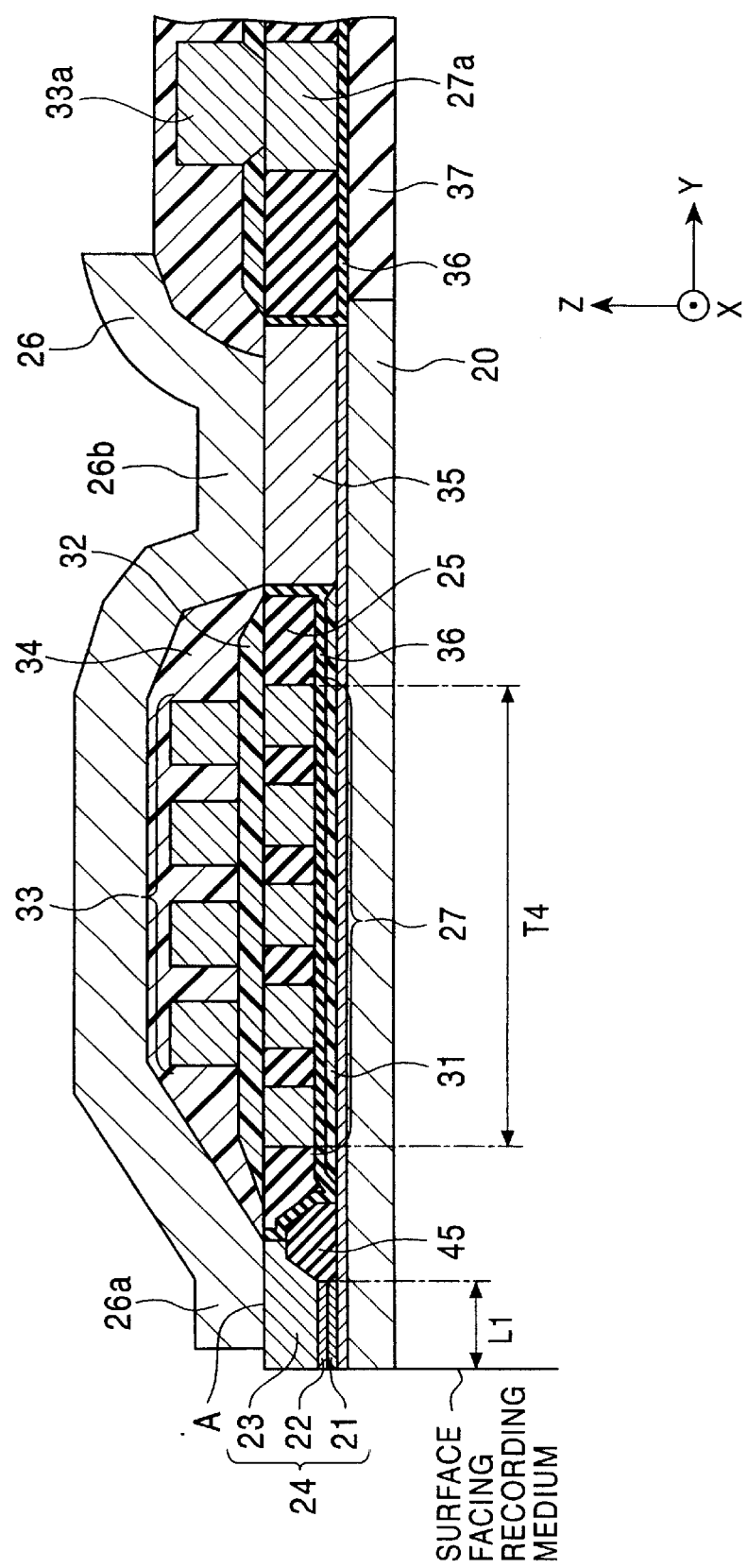
FIG. 4 is a partial sectional view showing the structure of a thin film magnetic head in accordance with still another embodiment of the present invention.

FIG. 1 is a partial front view showing the structure of a thin film magnetic head in accordance with an embodiment of the present invention, and FIG. 2 is a partial sectional view of the thin film magnetic head taken along line II—II in FIG. 1 as viewed from the arrow direction. FIG. 3 is a longitudinal sectional view of a thin film magnetic head in accordance with another embodiment of the present invention, and FIG. 4 is a longitudinal sectional view of a thin film magnetic head in accordance with still another embodiment of the present invention.

Although the thin film magnetic head shown in FIG. 1 is a recording inductive head, a reproducing head (MR head) using a magnetoresistive effect may be laminated below the inductive head.

In FIGS. 1 and 2, reference numeral 20 denotes a lower core layer made of a magnetic material, for example, such as permalloy or the like. In a case in which a reproducing head is laminated below the lower core layer 20, a shield layer may be provided separately from the lower core layer 20, for protecting a magnetoresistive element from noise, or the lower core layer 20 may be provided to function as an upper shield layer of the reproducing head without the shield layer.

As shown in FIG. 1, the upper surface 20a of the lower core layer extending from the base end of a lower pole layer 21, which will be described below, may be formed to extend in parallel with the track width direction (the X direction shown in FIG. 1), or inclined surfaces 20b may be formed to be inclined in the direction away from the upper core layer 26. By forming the inclined surfaces 20b at the top of the lower core layer 20, write fringing can be properly prevented.

As shown in FIG. 1, a recording region 24 is formed on the lower core layer 20. In this embodiment, the recording region 24 serves as a so-called track width regulating region having a track width Tw. The track width Tw is preferably 0.7 µm or less, more preferably 0.6 µm or less. This permits the manufacture of a thin film magnetic head adaptable to track narrowing.

In each of the embodiments shown in FIG. 1 to 4, the recording region 24 has a multilayer structure comprising three layers including the lower pole layer 21, a gap layer 22, and an upper pole layer 23. The pole layers 21 and 23, and the gap layer 22 will be described below.

As shown in FIGS. 1 to 4, the lower pole layer 21 serving as a lowermost layer of the recording region 24 is formed on the lower core layer 20 by plating. The lower pole layer 21 is magnetically connected to the lower core layer 20, and may be made of the same material as or a different material from the lower core layer 20. The lower pole layer 20 may comprise either a single layer film or a multilayer film.

As shown in FIGS. 1 and 2, the nonmagnetic gap layer 22 is laminated on the lower pole layer 21.

In the present invention, the gap layer 22 is preferably made of a nonmagnetic metal material, and formed by plating on the lower pole layer 21. As the nonmagnetic metal material, at least one material is preferably selected from NiP, NiPd, NiW, NiMo, NiRh, Au, Pt, Rh, Pd, Ru, Cr, and NiCu. The gap layer 22 may comprise either a single layer film or a multilayer film.

Then, the upper pole layer 23 is formed on the gap layer 22 to be magnetically connected to the upper core layer 26, which will be described below. The upper pole layer 23 may be made of the same material as or a different material from the upper core layer 26. The upper pole layer 23 may comprise either a single layer film or a multilayer film.

As described above, with the gap layer 22 made of a nonmagnetic metal material, the lower pole layer 21, the gap layer 22 and the upper pole layer 23 can be continuously formed by plating.

In the present invention, the recording region 24 is not limited to the above-described multilayer structure comprising the three layers. For example, the recording region 24 comprises the lower pole layer 21 connected directly to the lower core layer 20, and the gap layer 20 formed on the lower pole layer 21, or the upper pole layer 23 formed on the lower core layer 20 with the gap layer 22 provided therebetween and connected directly to the upper core layer 26.

As described above, the lower pole layer 21 and the upper pole layer 23, which constitute the recording region 24, may be made of the same material as or different materials from the core layers to which both pole layers are respectively magnetically connected. However, in order to improve the recording density, the lower pole layer 21 and the upper pole layer 23, which are opposite to the gap layer 22, preferably have higher saturation magnetic flux densities than those of the core layers to which both pole layers are respectively magnetically connected. With the lower pole layer 21 and the upper pole layer 23 having high saturation magnetic flux densities, a recording magnetic field can be concentrated near the gap to improve the recording density.

As shown in FIG. 1, the recording region 24 has a thickness dimension H4. For example, the lower pole layer 21 has a thickness of about 0.4 µm, the gap layer 22 has a thickness of about 0.2 µm, and the upper pole layer 23 has a thickness of about 2 µm.

As shown in FIGS. 2 to 4, the recording region 24 has a length dimension L1 in the height direction (the Y direction) from the surface (ABS) facing a recording medium.

The length dimension L1 is defined as gap depth Gd which is previously set to a predetermined length because it significantly influences the electric properties of the thin film magnetic head.

In each of the embodiments shown in FIGS. 2 to 4, the gap depth Gd is determined by the position where a Gd setting insulation layer 45 is formed on the lower core layer 20 so that the gap depth Gd is regulated by the length from the front end surface of the Gd setting insulation layer 45 to the surface (ABS) facing the recording medium.

In FIG. 1, a layer 25 formed on both sides of the recording region 24 on the lower core layer 20 serves as a coil insulation layer.

As shown in FIGS. 2 to 4, the coil insulation layer 25 is formed on the rear portion of the lower core layer 20, which is behind the recording region 24 in the height direction (the Y direction), to extend over the entire surface thereof. The coil insulation layer 25 is provided for filling the pitch intervals of a conductor which constitutes a coil layer 27.

The coil layer 27 formed on the rear portion of the lower core layer 20, which is behind the recording region 24 in the height direction, is made of a conductive material with low electric resistance, for example, such as Cu or the like. The coil layer 27 is formed in a spiral pattern having the winding center 27a as a center.

Although the methods of forming the coil layer 27 and the coil insulation layer 25 on the lower core layer 20 will be described later, in the present invention, it is possible to select one of the methods including the method in which the coil layer 27 is formed on the lower core layer 20, and then the pitch intervals of the conductor constituting the coil layer 27 are filled with the coil insulation layer, and the method in which the coil insulation layer 25 is formed on the lower core layer 20, coil forming grooves are formed in the coil insulation layer 25, and then the coil forming grooves are filled with the coil layer 27.

As shown in FIGS. 2 to 4, the upper surfaces of the coil insulation layer 25 and the coil layer 27 preferably lie in the same plane. In this case, the thickness of the coil layer 27 can be increased to the maximum limit within the thickness of the coil insulation layer 25, and thus a decrease in the width dimension of the conductor of the coil layer 27 does not cause an increase in the coil resistance value inversely proportional to the sectional area. The upper surface of the coil insulation layer 25 may be higher than the upper surface of the coil layer 27.

In order to form the upper surfaces of the coil insulation layer 25 and the coil layer 27 in the same plane, the upper surfaces of the coil insulation layer 25 and the coil layer 27 can be polished by, for example, CMP technique, as in the manufacturing method described below. As a result, the upper surfaces of both the coil insulation layer 25 and the coil layer 27 are polished surfaces.

As shown in FIGS. 2 to 4, assuming that the junction plane between the recording region 24 and the upper core layer 26 is reference plane A, the upper surfaces of the coil insulation layer 25 and the coil layer 27 are preferably located in the same plane as the reference plane A. Therefore, the thickness of the coil layer 27 can be increased to the maximum limit in a step formed between the recording region 24 and the lower core layer 20, and the width dimension of the coil layer 27 can be properly decreased without increasing the coil resistance value inversely proportional to the sectional area.

However, in the present invention, unlike in FIGS. 2 to 4, the coil insulation layer 25 and the coil layer 27 may be formed so that the upper surfaces thereof do not lie in the same plane as the reference surface A. Namely, the coil insulation layer 25 and the coil layer 27 may be formed so that the upper surfaces thereof are higher or lower the reference surface A.

In each of the embodiments shown in FIGS. 1 to 4, the coil insulation layer 25 is an inorganic insulation layer made of an inorganic material. As the inorganic material, at least one material is preferably selected from AlO, $Al_2O_3$, $SiO_2$, $Ta_2O_5$, TiO, AlN, AlSiN, TiN, SiN, $Si_3N_4$, NiO, WO, $WO_3$, BN. CrN, SiON, and AlSiO.

It is undesirable to use an organic material for the coil insulation layer 25 from the reasons below. As described in detail later, in polishing the upper surfaces of the coil insulation layer 25 and the coil layer 27 by the CMP technique, the upper surface of the coil insulation layer 25 made of an organic material cannot be appropriately polished because of the stickiness peculiar to the organic material, thereby causing difficulties in forming the upper surfaces of the coil insulation layer 25 and the coil layer 27 in the same plane.

However, in the above-described method in which the coil layer 27 is patterned on the lower core layer, and then the pitch intervals of the conductor of the coil layer 27 are filled with the coil insulation layer 25, cavities are undesirably easily formed in the coil insulation layer during the step of embedding the coil insulation layer 25. This is due to the fact that in forming the coil insulation layer 25 by sputtering, an inorganic material for the coil insulation layer 25 cannot be easily inserted into the narrow pitch intervals of the coil 27 to form cavities in the coil insulation layer 25. Therefore, in the method comprising filling the pitch intervals of the conductor of the coil layer 27 with the coil insulation layer 25, the pitch intervals are first filled with an organic material to some extend, and then an inorganic material for the coil insulation layer 25 is formed on the organic material layer to prevent the problem of forming cavities.

As shown in FIGS. 2 to 4, an insulation layer 32 made of an organic material such as resist or polyimide is formed on the coil layer 27 and the coil insulation layer 25, and a second coil layer 33 is formed in a spiral pattern on the insulation layer 32. The winding center 33a of the second coil layer 33 is electrically connected directly to the winding center 27a of the coil layer 27 formed on the same plane as the junction plane (the reference plane A) between the recording region 24 and the upper core layer 26.

As shown in FIGS. 2 to 4, the second coil layer 33 is covered with an insulation layer 34 made of an organic material such as resist or polyimide, and the upper core layer 26 made of a magnetic material such as permalloy or the like is formed on the insulation layer 34 by frame plating.

As shown in FIGS. 2 to 4, the front end 26a of the upper core layer 26 is formed in contact with the top of the recording region 24, and the base end 26b is magnetically connected to the top of a lifting layer (back gap layer) 35 made of a magnetic material and formed on the lower core layer 20. The lifting layer 35 is not necessarily formed. In this case, the base end 26b of the upper core layer 26 is extended to the lower core layer 20 to be magnetically connected directly to the lower core layer 20. As shown in FIG. 1, the front end 26a of the upper core layer 26 has a width dimension T3 which is larger than the track width Tw.

The thin film magnetic heads shown in FIGS. 2 to 4 are different from each other in the structure of an insulation underlying layer formed between the lower core layer 20 and the coil layer 27.

As shown in FIG. 2, a plated underlying layer 30 is formed on the lower core layer 20, and an organic insulation underlying layer 31 made of an organic insulating material is formed on the plated underlying layer 30.

It is necessary that an appropriate withstand voltage is maintained between the lower core layer 20 and the coil layer 27. In order to improve withstand voltage, an organic insulating material is rather preferably used than an inorganic material.

Although a resist or polyimide is used as the organic insulating material, such an organic material is coated on the lower core layer 20, and thus defects such as pin holes or the like are less formed in the organic insulation underlying layer 31 due to stickiness peculiar to the organic material.

On the other hand, in use of an inorganic insulating material, the insulation underlying layer is generally formed by sputtering. In this case, the insulation underlying layer is contaminated with impurities such as dust particles present in the sputtering apparatus used, or defects such as pin holes or the like are easily formed in the thin insulation underlying layer, thereby causing a difficulty in sufficiently improving the withstand voltage.

In the present invention, therefore, the organic insulation underlying layer 31 is formed between the lower core layer 20 and the coil layer 27 so that even with the thin insulation underlying layer 31, the withstand voltage between the lower core layer 20 and the coil layer 27 can be appropriately improved.

As shown in FIG. 3, an inorganic insulation underlying layer 36 made of an inorganic insulating material may be formed on the lower core layer 20, and the organic insulation underlying layer 31 may be formed on the inorganic insulation underlying layer 36.

Alternatively, as shown in FIG. 4, the organic insulation underlying layer 31 may be formed on the lower core layer 20, and the inorganic insulation underlying layer 36 may be formed on the organic insulation underlying layer 31.

Namely, in the embodiments shown in FIGS. 3 and 4, the two insulation underlying layers are formed between the lower core layer 20 and the coil layer 27, thereby improving the withstand voltage as compared with a conventional inorganic insulation underlying layer comprising a single layer.

As shown in FIG. 3, in the structure in which the inorganic insulation underlying layer 36 is formed on the lower core layer 20, and the organic insulation underlying layer 31 is formed on the inorganic insulation underlying layer 36, the problem of forming defects such as pin holes or the like in the inorganic insulation underlying layer 36 can be resolved by forming the organic insulation underlying layer 31 to fill the pin holes with the organic insulation underlying layer 31, thereby further improving the withstand voltage.

In the present invention, a plurality of the inorganic insulation underlying layers 36 and the organic insulation underlying layers 31 may be laminated. In this case, the gap between the lower core layer 20 and the coil layer 27 must be appropriately controlled.

The gap between the lower core layer 20 and the coil layer 27, i.e., the thickness of the organic insulation underlying layer 31 shown in FIG. 2, the total thickness of the organic insulation underlying layer 31 and the inorganic insulation underlying layer 36 shown in FIGS. 3 and 4, or the total thickness of the plurality of the inorganic insulation underlying layers 36 and the organic insulation underlying layers 31, is preferably large from the viewpoint of improvement in the withstand voltage. However, conversely, the large gap undesirably causes an increase in the length of the magnetic path ranging from the lower core layer 20 to the upper core layer 26 to increase inductance.

In each of the embodiments shown in FIGS. 2 to 4, the upper surface of the coil layer 27 and the junction plane (reference plane A) between the recording region 24 and the upper core layer 26 are formed in the same plane. Therefore, as the thickness of the insulation underlying layer formed between the coil layer 27 and the lower core layer 20 increases, the thickness of the coil layer 27 decreases.

With the thin coil layer 27, the width dimension T4 of the coil layer 27 must be increased in order to decrease the coil resistance value. Therefore, the magnetic path ranging from the lower core layer 20 to the upper core layer 26 is lengthened to increase inductance, thereby failing to the manufacture of a thin film magnetic head adaptable to a higher recording density in future.

In the present invention, therefore, the gap between the lower core layer 20 and the coil layer 27 is preferably as small as possible within a range which allows the withstand voltage to be sufficiently maintained. For example, the gap is substantially the same as the thickness of a conventional inorganic insulation underlying layer comprising a single layer formed between the lower core layer 20 and the coil layer 27.

More specifically, the gap between the lower core layer 20 and the coil layer 27 is preferably in the range of 0.35 $\mu$m to 1.5 $\mu$m.

In this range, the thick coil layer 27 can be formed on the insulation underlying layer while appropriately maintaining the withstand voltage between the lower core layer 20 and the coil layer 27.

The thickness of the inorganic insulation underlying layer 36 is preferably in the range of 0.15 $\mu$m to 0.5 $\mu$m.

The thickness of the organic insulation underlying layer 31 is preferably in the range of 0.2 $\mu$m to 1.0 $\mu$m.

As described above, a resist or polyimide is preferably used as the organic insulating material for the organic insulation underlying layer 31.

In the present invention, the inorganic insulation underling layer 36 is preferably made of at least one inorganic insulating material selected from AlO, $Al_2O_3$, $SiO_2$, $Ta_2O_5$, TiO, AlN, AlSiN, TiN, SiN, $Si_3N_4$, NiO, WO, $WO_3$, BN, CrN, SiON, and AlSiO.

As shown in FIGS. 2 to 4, the organic insulation underlying layer 31 is formed on the lower core layer 20 between the recording region 24 and the lifting layer 35, but not formed on the rear side behind the lifting layer 35 in the height direction (the Y direction).

The reason for this is that as shown in FIGS. 2 to 4, the base end of the lower core layer 20 is located near the lifting layer 35, and an insulation layer 37 made of $Al_2O_3$ or the like is formed behind the lower core layer 20 in the height direction.

The surfaces of the lower core layer 20 and the insulation layer 37 are planarized in the same plane by using the CMP technique or the like, and the winding center 27a of the coil layer 27 and the conductor of the coil layer 27 (not shown), which extends in the portion behind the winding center 27a in the height direction, are formed on the insulation layer 37.

Namely, as described above, in the portion where the lower core layer 20 is not formed, the insulation layer 37 having high withstand voltage is formed below the winding center 27a and the conductor of the coil layer 27. Therefore, the organic insulation underlying layer 31 for ensuring magnetic insulation need not be formed in that portion, and thus the organic insulation underlying layer 31 is formed on the portion of the lower core layer between the recording region 24 and the lifting layer 35, where magnetic insulation between the coil layer 27 and the lower core layer 20 is required.

However, as shown in FIGS. 3 and 4, the inorganic insulation underlying layer 36 is also formed on the insulation layer 27. As described above, the coil layer 27 formed on the insulation layer 37 had no need to form an insulation underlying layer for increasing the withstand voltage below the coil layer 27. However, in the step of forming the inorganic insulation underlying layer 36, it is convenient to form the inorganic insulation underlying layer 36 not only on the lower core layer 20 but also on the insulation layer 27 by sputtering or the like, thereby inevitably forming the inorganic insulation underlying layer 36 on the insulation layer 37. Therefore, from the viewpoint of improvement in the withstand voltage, the inorganic insulation underlying layer 36 may be formed or not on the insulation layer 37.

Figure 5:
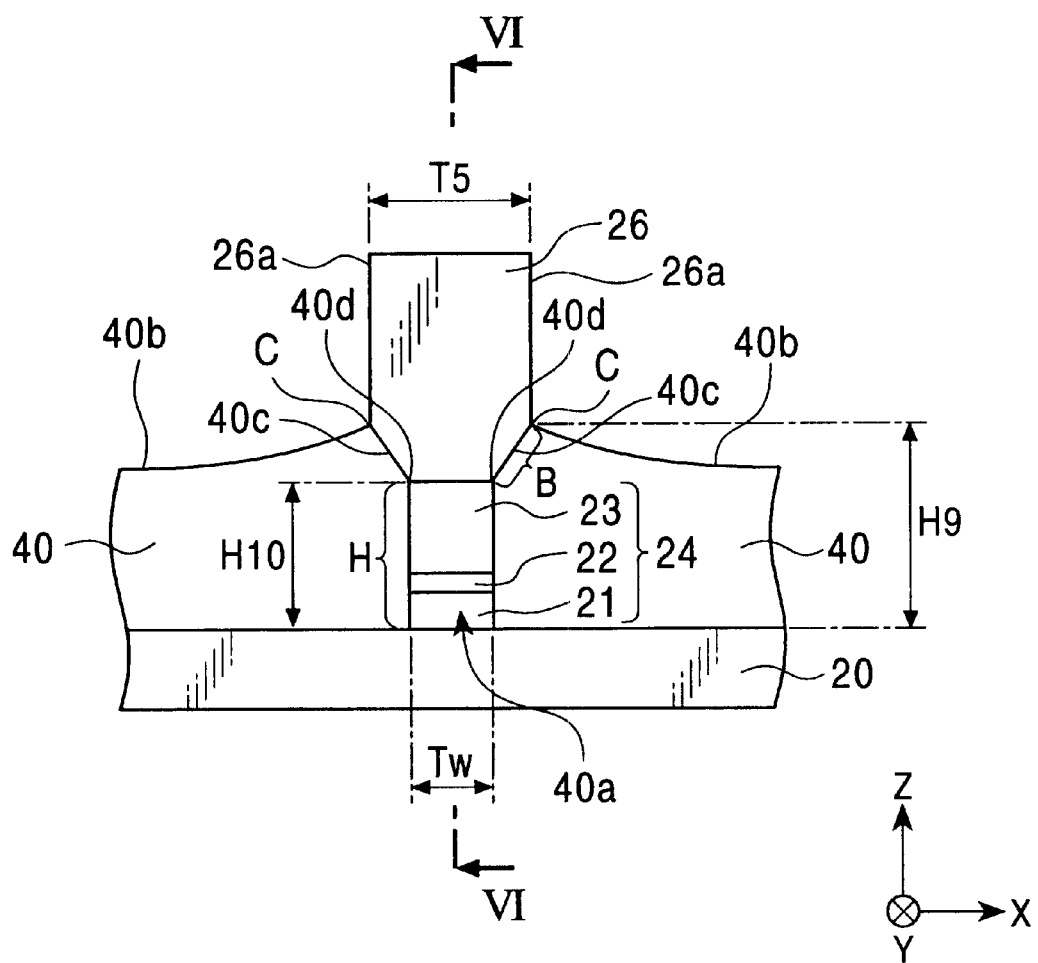
FIG. 5 is a partial front view showing the structure of a thin film magnetic head in accordance with a further embodiment of the present invention.
Figure 6:
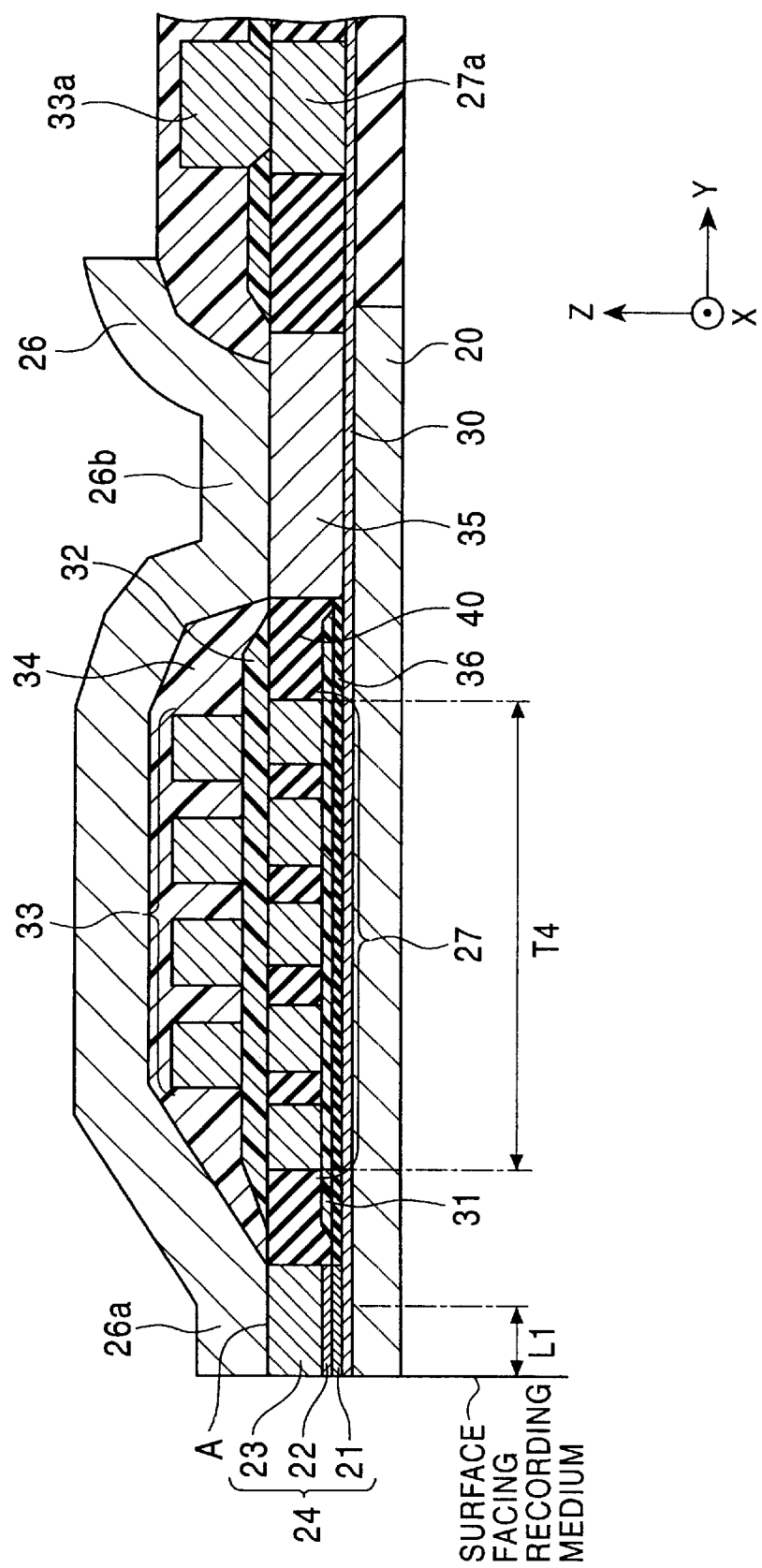
FIG. 6 is a partial sectional view of the thin film magnetic head shown in FIG. 5 taken along line VI—VI in FIG. 5.

FIG. 5 is a partial front view showing the structure of a thin film magnetic head in accordance with a further embodiment of the present invention, and FIG. 6 is a partial sectional view of the thin film magnetic head taken along line VI—VI in FIG. 5, as viewed from the arrow direction.

In FIGS. 5 and 6, reference numeral 20 denotes a lower core layer made of a soft magnetic material having high magnetic permeability, such as a Fe—Ni alloy (permalloy) or the like.

As shown in FIG. 5, a coil insulation layer 40 made of an insulating material is formed on the lower core layer 20. The insulating material is preferably an inorganic material, for example, at least one material of AlO, $Al_2O_3$, $SiO_2$, $Ta_2O_5$, TiO, AlN, AlSiN, TiN, SiN, $Si_3N_4$, NiO, WO, $WO_3$, BN, CrN, SiON, and AlSiO. The coil insulation layer 40 comprises a single layer or a multilayer film.

As shown in FIG. 5, the thickest portion of the coil insulation layer 40 has a thickness dimension H9. Specifically, the thickness dimension H9 is preferably about 1.0 $\mu$m to about 4.0 $\mu$m.

In the present invention, a trench 40a is formed in the coil insulation layer 40 to extend from the surface 40b of the coil insulation layer 40 to the top of the lower core layer 20, and have a predetermined length dimension L2 in the height direction (the Y direction) from the surface (ABS) facing the recording medium.

As shown in FIG. 5, the trench 40a comprises a track width region H formed with the track width Tw to a predetermined height H10 from the top of the lower core layer 20, and an inclined region B having inclined surfaces 40c formed to gradually increase the width dimension of the trench 40a from the upper ends 40d of the track width region H to the surface of the coil insulation underlying layer 40. The trench 40a is formed by, for example, anisotropic etching.

In the present invention, the track width region H of the trench 40a has a width dimension (i.e., the track width Tw) of 0.7 $\mu$m or less, preferably 0.6 $\mu$m or less.

In the embodiment shown in FIG. 5, a recording region 24 comprising a magnetic layer and a nonmagnetic gap layer is laminated in the track width region H.

The recording region 24 comprises a lower pole layer 21 connected directly to the lower core layer 20, a nonmagnetic gap layer 22, and an upper pole layer 23 connected directly to the upper core layer 26.

The gap layer 22 is made of a nonmagnetic metal material, and preferably formed on the lower pole layer 21 by plating. In the present invention, as the nonmagnetic metal material, at least one material is preferably selected from NiP, NiPd, NiW, NiMo, NiRh, Au, Pt, Rh, Pd, Ru, Cr, and NiCu. The gap layer 22 may comprise either a single layer film or a multilayer film.

The material and the film structure of the lower pole layer 21 and the upper pole layer 23 are the same as the lower pole layer 21 and the upper pole layer 23 shown in FIG. 1.

In the present invention, the recording region 24 is not limited to the multilayer structure comprising three layers. For example, in the present invention, the recording region 24 may comprise the lower pole layer 21 connected directly to the lower core layer 20, and the gap layer 22 formed on the lower pole layer 21, or the upper pole layer 23 formed on the lower core layer 20 with the gap layer provided therebetween to be connected directly to the upper core layer 26.

In the present invention, as shown in FIG. 5, the upper core layer 26 is formed to extend from the inclined surfaces 40c formed in the trench 40a to the boundaries C between the inclined surfaces 40c and the surface 40b of the coil insulation layer 40, and further extend from the boundaries C in the direction (the upward direction in the drawing) away from the lower core layer 20.

As shown in FIG. 5, the bottom of the upper core layer 26 is magnetically connected to the upper pole layer 23. The upper core layer 26 is made of a magnetic material such as permalloy or the like, and may be made of the same material as or a different material from the upper pole layer 23.

As shown in FIG. 5, the width direction T5 of the upper core layer 26 in the track width direction (the X direction shown in the drawing) is larger than the width dimension (i.e., the track width Tw) of the recording region 24 formed in the track width region H. By forming the upper core layer 26 having the large width dimension T5, magnetic saturation can be suppressed.

In the embodiment shown in FIG. 5, the coil insulation layer 40 is formed with the thickness H9 near the boundaries C between the inclined surfaces 40c of the trench 40a and the surface 40c of the coil insulation layer 40 so that the thickness gradually decreases in the direction away from the trench 40a from the boundaries C. As shown in FIG. 5, the surface 40b of the coil insulation layer 40 is concavely curved.

In FIG. 5, the surface 40b of the coil insulation layer 40 is concavely curved so that the thickness of the coil insulation layer 40 gradually decreases in the direction away from the trench 40a. However, the coil insulation layer 40 may be formed to have substantially the same thickness at any position, or the surface 40b thereof may be tapered (inclined), not curved.

As shown in FIG. 6, the coil insulation layer 40 is formed on the rear portion of the lower core layer 20, which is behind the recording region 24 in the height direction (the Y direction shown in the drawing).

In the coil insulation layer 40, coil forming grooves are formed so that the coil forming grooves are filled with the coil layer 27.

In this embodiment, like in the embodiment shown in FIG. 3, an inorganic insulation underlying layer 36 is formed on the lower core layer 20 between the recording region 24 and the lifting layer 35, and an organic insulation underlying layer 31 is formed on the inorganic insulation underlying layer 36. Therefore, the withstand voltage between the lower core layer 20 and the coil layer 28 can be improved.

The gap between the lower core layer 20 and the coil layer 27 is preferably in the range of 0.35 $\mu$m to 1.5 $\mu$m, the thickness of the inorganic insulation underlying layer 36 is preferably in the range of 0.15 $\mu\mu$m to 0.5 $\mu$m, and the thickness of the organic insulation underlying layer 31 is preferably in the range of 0.2 $\mu\mu$m to 1.0 $\mu$m.

In these ranges, the thickness of the coil layer 27 formed on the insulation underlying layer can be increased to realize a short magnetic path ranging from the lower core layer 20 to the upper core layer 26, thereby permitting the manufacture of a thin film magnetic head adaptable to a higher recording density in future.

In the present invention, only the organic insulation underlying layer 31 may be formed between the lower core layer 20 and the coil layer 27, as shown in FIG. 2, or the organic insulation underlying layer 31 and the inorganic insulation underlying layer 36 may be formed in turn on the lower core layer 20, as shown in FIG. 4.

Although, as shown in FIG. 6, the upper surfaces of the coil insulation layer 40 and the coil layer 27 are formed in the same plane, the thickness of the coil layer 27 can be increased to the maximum limit within the thickness of the coil insulation layer 40. The upper surfaces of the coil insulation layer 40 and the coil layer 27 are preferably polished surfaces. This can be achieved by using, for example, the CMP technique, as described in the manufacturing method below.

Assuming that the junction plane between the recording region 24 and the upper core layer 26 is reference plane A, the upper surfaces of the coil insulation layer 40 and the coil layer 27 are preferably located in the same plane as the reference plane A. In this case, the thickness of the coil layer 27 can be increased to the maximum limit within the step between the recording region 24 and the lower core layer 20, and thus the coil resistance value inversely proportional to the sectional area is not increased even when the width direction of the coil layer 27 is decreased. However, in FIG. 6, the upper surfaces of the coil insulation layer 40 and the coil layer 27 are formed at a position higher than the reference plane A.

As shown in FIG. 6, an insulation layer 32 is formed on the upper surfaces of the coil insulation layer 40 and the coil layer 27, and a second coil layer 33 is formed in a spiral pattern on the insulation layer 32. As shown in FIG. 6, the winding center 33a of the second coil layer 33 is formed directly on the winding center 27a of the first coil layer 27 so that the coil layer 27 and the second coil layer 33 are electrically connected to each other.

Furthermore, an insulation layer 34 is formed on the second coil layer 33, and the upper core layer 26 is formed on the recording region 24 and the insulation layer 34 by, for example, frame plating or the like. As shown in FIG. 6, the front end 26a of the upper core layer 26 is connected directly to the top of the recording region 24, and the base end 26b is connected directly to the top of the lifting layer (back gap layer) 35 formed on the lower core layer 20 and mage of a magnetic material to form a magnetic path ranging from the lower core layer 20 to the upper core layer 26.

The embodiment shown in FIG. 6 is different from the embodiments shown in FIGS. 2 to 4 in the manufacturing method, as described below.

In each of the embodiments shown in FIGS. 2 to 4, the recording region 24 is first formed on the lower core layer 20, the organic insulation underlying layer 31 or the organic insulation underlying layer 31 and the inorganic insulation underlying layer 36 are formed on the lower core layer 20, and then the coil layer 27 and the coil insulation layer 25 are formed on the insulation underlying layer.

On the other hand, in the embodiment shown in FIG. 6, the organic insulation underlying layer 31 or the organic insulation underlying layer 31 and the inorganic insulation underlying layer 36 are first formed on the lower core layer 20, the coil insulation layer 40 and the recording region 24 are formed, and then the coil layer 27 is finally formed.

Figure 7:
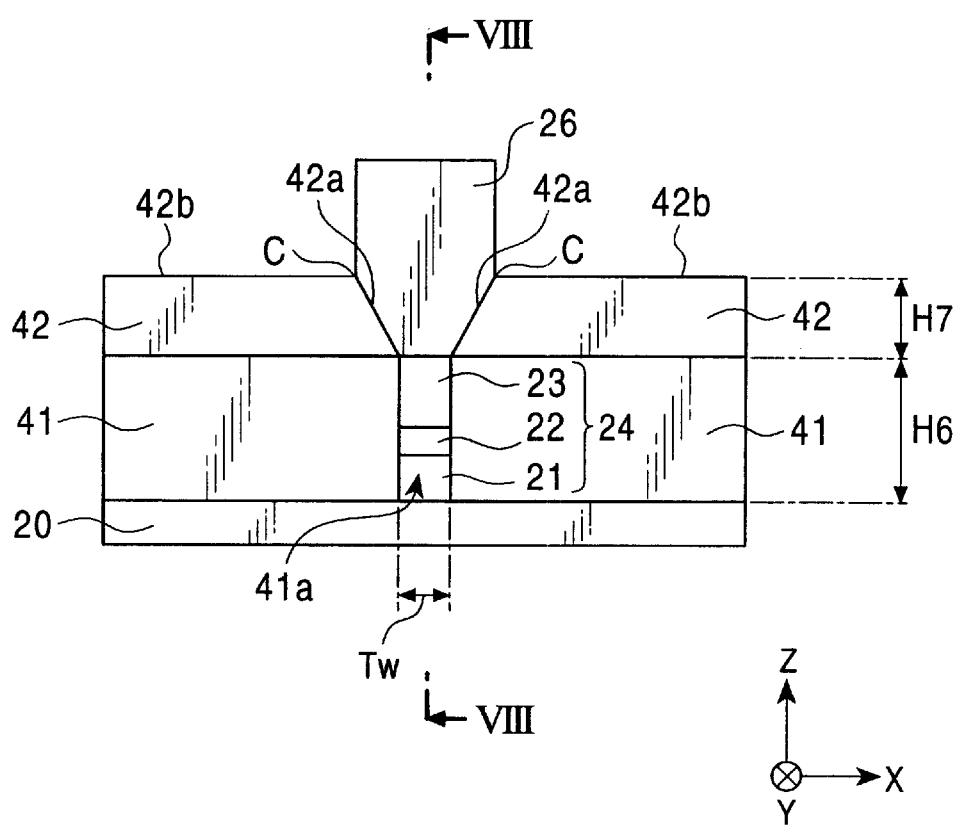
FIG. 7 is a partial front view showing the structure of a thin film magnetic head in accordance with a still further embodiment of the present invention.
Figure 8:
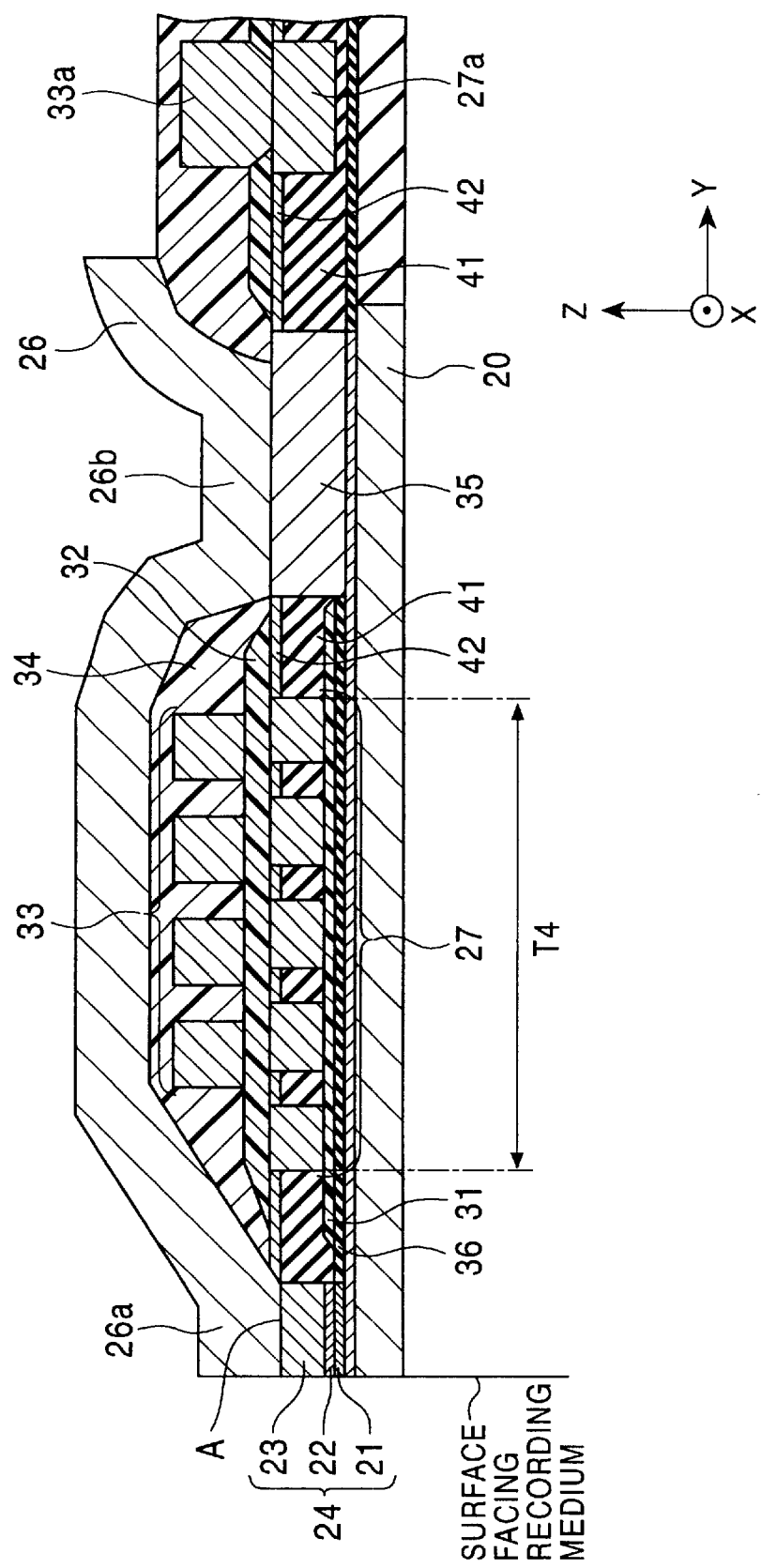
FIG. 8 is a partial sectional view of the thin film magnetic head shown in FIG. 7 taken along line VIII—VIII in FIG. 7.

FIG. 7 is a partial front view showing the structure of a thin film magnetic head in accordance with a further embodiment of the present invention, and FIG. 8 is a partial sectional view of the thin film magnetic head taken along line VIII—VIII in FIG. 7, as viewed from the arrow direction.

In FIG. 7, reference numeral 20 denotes a lower core layer made of a soft magnetic material having high magnetic permeability, such as a Fe—Ni alloy (permalloy) or the like.

As shown in FIG. 7, a main coil insulation layer 41 made of an insulating material is formed on the lower core layer 20, and a sub-coil insulation layer 42 is formed on the main coil insulation layer 41.

Both the main coil insulation layer 41 and the sub-coil insulation layer 42 preferably comprise an inorganic insulation layer of an inorganic material. However, in this embodiment, the etching rate of the main coil insulation layer 41 is higher than the etching rate of the sub-coil insulation layer 42. Particularly, the difference between the etching rates is preferably 10 times or more.

The main coil insulation layer 41 comprises, for example, at least one of AlO, $SiO_2$, $Ta_2O_5$, TiO, AlN, AlSiN, TiN, SiN, $Si_3N_4$, NiO, WO, $WO_3$, BN, CrN, and SiON. The main coil insulating layer 41 comprises a single layer or a multilayer film.

For example, with the main coil insulation layer 41 made of $Si_2O_3$, the sub-coil insulation layer 42 is preferably made of $Al_2O_3$ and/or $Si_3N_4$.

With the main coil insulation layer 41 made of $SiO_2$, and the sub-coil insulation layer 42 made of $Al_2O_3$, the use of $C_3F_8$+(Ar) as gas for reaction ion etching can increase the etching rate of the main coil insulation layer 41 in reaction ion etching to about 15 times the etching rate of the sub-coil insulation layer 42.

With the main coil insulation layer 41 made of $SiO_2$, and the sub-coil insulation layer 42 made of $Si_3N_4$, the use of $C_5F_8$+(Ar) as gas for reaction ion etching can increase the etching rate of the main coil insulation layer 41 in reaction ion etching to about 15 times the etching rate of the sub-coil insulation layer 42.

As shown in FIG. 7, a trench 41a is formed with the trench width Tw in the main coil insulation layer 41 to have a predetermined length in the height direction (the Y direction shown in the drawing) from the surface facing the recording medium. The track width Tw is preferably 0.7 μm or less, and more preferably 0.6 μm or less.

As shown in FIG. 7, the main coil insulation layer 41 is formed with a thickness dimension H6, which is preferably about 1.0 μm to about 4.0 μm. The sub-coil insulation layer 42 is formed with a thickness dimension H7 on the main coil insulation layer 41, the thickness dimension H7 being preferably smaller than the thickness dimension H6 of the main coil insulation layer 41. The sub-coil insulation layer 42 may comprise a single layer film or a multilayer film.

As shown in FIG. 7, a recording region 24 comprising three layers including a lower pole layer 21, a nonmagnetic gap layer 22, and an upper pole layer 23 is formed in the trench 41a formed in the main coil insulation layer 41.

The gap layer 22 is preferably made of a nonmagnetic metal material, and formed by plating on the lower pole layer 21. As the nonmagnetic metal material, at least one material is preferably selected from NiP, NiPd, NiW, NiMo, NiRh, Au, Pt, Rh, Pd, Ru, Cr, and NiCu. The gap layer 22 may comprise either a single layer film or a multilayer film.

The materials and the film structures of the upper pole layer 21 and the lower pole layer 23 are the same as the upper pole layer 21 and the lower pole layer 23 shown in FIG. 1.

In the present invention, the recording region 24 is not limited to the above multilayer structure comprising the three layers. For example, the recording region 24 may comprise the lower pole layer 21 connected directly to the lower core layer 20, and the gap layer 22 formed on the lower pole layer 21, or the upper pole layer 23 formed on the lower core layer 20 with the gap layer 22 provided therebetween and connected directly to the upper core layer 26.

As shown in FIG. 7, the sub-coil insulation layer 42 formed on the main coil insulation layer 41 has inclined surfaces 42a formed therein to start from the upper ends of the trench 41a formed in the main coil insulation layer 41 so that the dimension in the track width direction (the X direction shown in the drawing) gradually increases.

Furthermore, the upper core layer 26 is formed by plating on the surface of the upper pole layer 23 formed in the trench 41a along the inclined surfaces 42a. The upper core layer 26 is preferably formed to extend to the boundaries C between the inclined surfaces 42a and the surface 42b of the sub-coil insulation layer 42. By forming the upper core layer 26 to extend to the boundaries C, the width dimension of the upper core layer 26 can be increased to prevent the occurrence of magnetic saturation even with a higher recording density in future.

As shown in FIG. 8, the main coil insulation layer 41 and the sub-coil insulation layer 42 are formed on the rear portion of the lower core layer 20, which is behind the recording region 24 in the height direction (the Y direction shown in the drawing).

As shown in FIG. 8, coil forming grooves are continuously formed in the sub-coil insulation layer 42 and the main coil insulation layer 41, and the coil forming grooves are filled with a coil layer 27.

In this embodiment, an inorganic insulation underlying layer 36 and an organic insulation underlying layer 31 are interposed between the coil layer 27 and the lower core layer 20. The organic insulation underlying layer 31 is formed on the inorganic insulation underlying layer 36 to fill defects such as pin holes or the like formed in the inorganic insulation underlying layer 36 with the organic insulation underlying layer 31, thereby improving the withstand voltage between the coil layer 27 and the lower core layer 20.

In the present invention, the insulation underlying layer may have a structure other than the above, and the insulation underlying layer may comprise only the organic insulation underlying layer 31 as shown in FIG. 2, or the inorganic insulation underlying layer 36 formed on the organic insulation underlying layer 31 as shown in FIG. 4.

In the present invention, the gap between the coil layer 27 and the lower core layer 20 is preferably in the range of 0.35 μm to 1.5 μm. In this case, the thickness of the inorganic insulation underlying layer 36 is preferably in the range of 0.15 μm to 0.5 μm, and the thickness of the organic insulation underlying layer 31 is preferably in the range of 0.2 μm to 1.0 μm.

Although, as shown in FIG. 8, the upper surfaces of the sub-coil insulation layer 42 and the coil layer 27 are formed in the same plane, the thickness of the coil layer 27 can be increased to the maximum limit within the total thickness of the main coil insulation layer 41 and the sub-coil insulation layer 42. The upper surfaces of the sub-coil insulation layer 42 and the coil layer 27 are preferably polished surfaces. This can be achieved by using, for example, the CMP technique, as described in the manufacturing method below.

Assuming that the junction plane between the recording region 24 and the upper core layer 26 is reference plane A, the upper surfaces of the sub-coil insulation layer 42 and the coil layer 27 are preferably located in the same plane as the reference plane A. In this case, the thickness of the coil layer 27 can be increased to the maximum limit within the step between the recording region 24 and the lower core layer 20, and thus the coil resistance value inversely proportional to the sectional area is not increased even when the width direction of the coil layer 27 is decreased. However, in FIG. 8, the upper surfaces of the sub-coil insulation layer 42 and the coil layer 27 are formed to a height higher than the reference plane A.

As shown in FIG. 8, an insulation layer 32 is formed on the upper surfaces of the sub-coil insulation layer 42 and the coil layer 27, and a second coil layer 33 is formed in a spiral pattern on the insulation layer 32. As shown in FIG. 8, the winding center 33a of the second coil layer 33 is formed directly on the winding center 27a of the first coil layer 27 so that the coil layer 27 and the second coil layer 33 are electrically connected to each other.

Furthermore, an insulation layer 34 is formed on the second coil layer 33, and the upper core layer 26 is formed on the recording region 24 and the insulation layer 34 by, for example, frame plating or the like. As shown in FIG. 8, the front end 26a of the upper core layer 26 is connected directly to the top of the recording region 24, and the base end 26b is connected directly to the top of a lifting layer (back gap layer) 35 formed on the lower core layer 20 and mage of a magnetic material to form a magnetic path ranging from the lower core layer 20 to the upper core layer 26.

Figure 9:
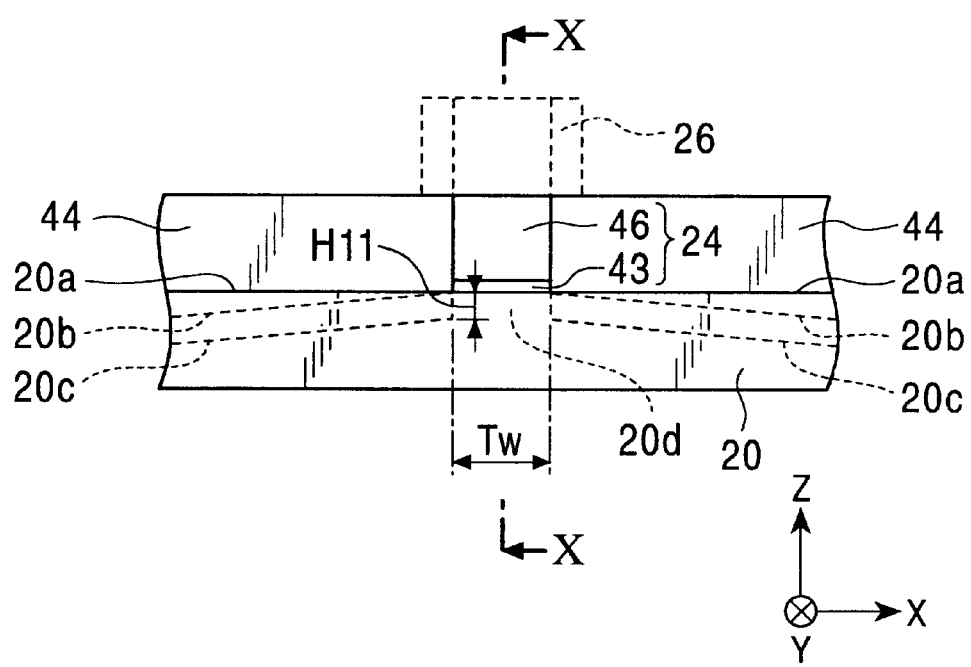
FIG. 9 is a partial front view showing the structure of a thin film magnetic head in accordance with a further embodiment of the present invention.
Figure 10:
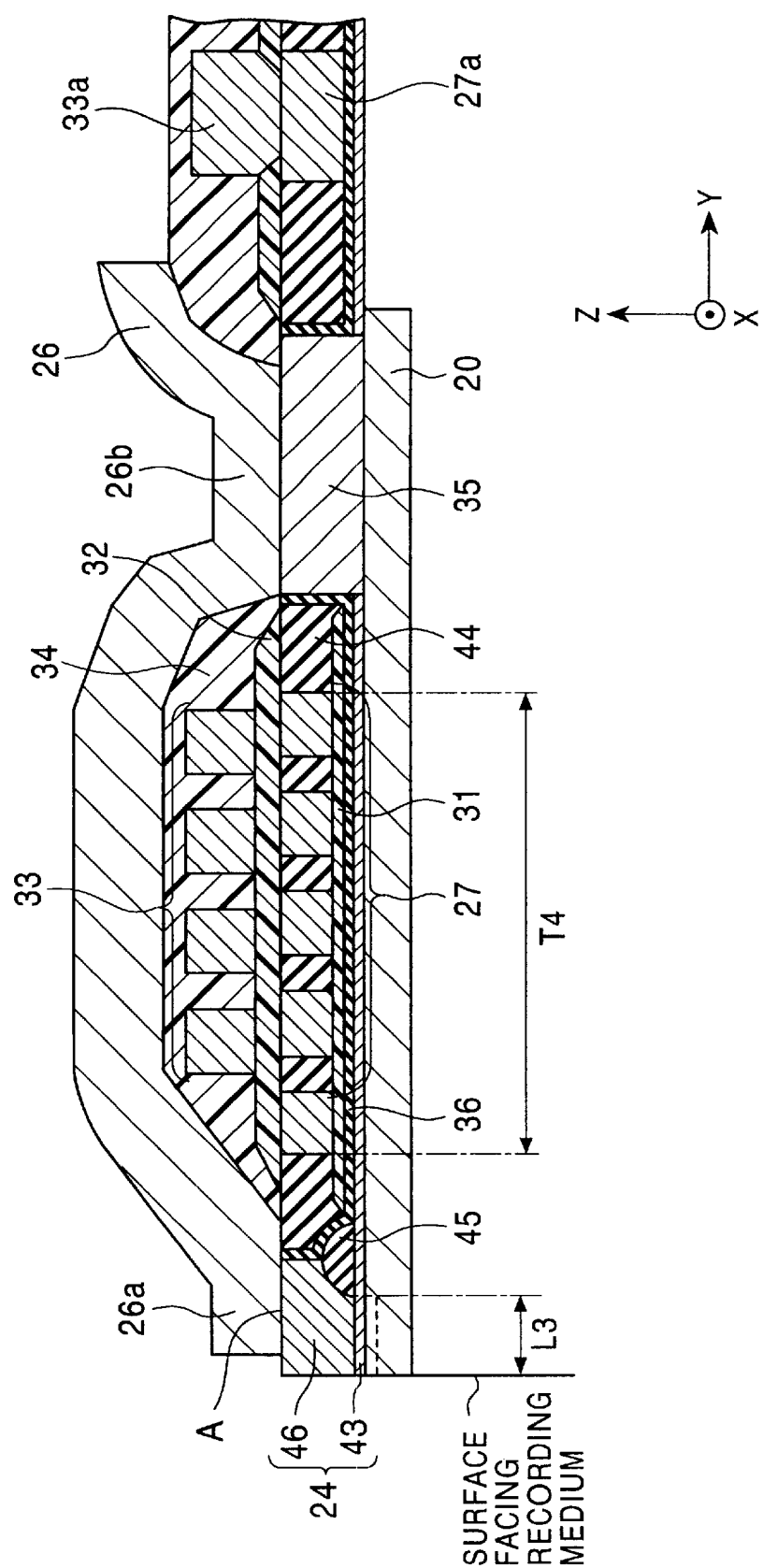
FIG. 10 is a partial sectional view of the thin film magnetic head shown in FIG. 10 taken along line X—X in FIG. 9.

FIG. 9 is a partial front view showing the structure of a thin film magnetic head in accordance with a further embodiment of the present invention, and FIG. 10 is a partial sectional view of the thin film magnetic head taken along line X—X in FIG. 9, as viewed from the arrow direction.

In FIG. 9, reference numeral 20 denotes a lower core layer made of a soft magnetic material having high magnetic permeability, such as a Fe—Ni alloy (permalloy) or the like.

As shown in FIG. 9, a recording region 24 comprising a nonmagnetic gap 43 and an upper pole layer 46 connected directly to an upper core layer 26 is formed on the lower core layer 20, the recording region having the track width Tw.

In the present invention, the gap layer 43 is preferably made of an inorganic insulating material. In this case, as the inorganic insulating material, at least one material is preferably selected from $Al_2O_3$, $SiO_2$, SiON, AlN, AlSiN, and AlSiO.

As shown in FIG. 9, the upper surface 20a of the lower core layer 20, which extends from the base end of the gap layer 43, may be formed to extend in parallel to the track width direction (the X direction shown in the drawing), or inclined surfaces 20b may be formed to be inclined in the direction away from the upper core layer 26. By forming the inclined surfaces 20b at the top of the lower core layer 20, write fringing can properly be prevented.

As shown in FIG. 9, the lower core layer 20 is ground to the portion denoted by reference numeral 20c, and a protrusion 20d projecting toward the upper core layer 26 is formed on the lower core layer 20 so that the recording region 24 is formed on the protrusion 20d. In this case, the occurrence of write fringing can be further prevented.

The protrusion 20d has a width dimension corresponding to the track width Tw, and a height dimension H1. For example, the height dimension H1 is in the range of 0.2 μm to 0.5 μm.

As shown in FIG. 9, a coil insulation layer 44 is formed on both sides of the recording region 24 in the track width direction (the X direction shown in the drawing). Furthermore, the upper core layer 26 having a width dimension larger than the track width Tw is formed on the recording region 24 and the coil insulation layer 44. The the width dimension of the upper core layer 26 may be equal to the track width Tw, as shown by dotted lines.

As shown in FIG. 10, the coil insulation layer 44 is formed on the rear portion of the lower core layer 20 behind the recording region 24 in the height direction (the Y direction shown in the drawing). The pitch intervals of a conductor of a coil layer 27 are filled with the coil insulation layer 44.

The coil insulation layer 44 and the coil layer 27 are formed as described above with reference to FIGS. 2 to 4. Namely, the coil insulation layer 44 is formed after the coil layer 27 is formed, or coil forming grooves are formed in the coil insulation layer, and then the coil forming grooves are filled with a conductive material to form the coil layer 27.

In this embodiment, as shown in FIG. 10, the gap layer 43 is formed to extend to the portion on the coil layer 27 where the coil 27 to be formed.

Therefore, the gap layer 43 is interposed between the coil layer 27 and the lower core layer 20. However, since the gap layer 43 is thin, the withstand voltage between the coil layer 27 and the lower core layer 20 cannot be easily properly maintained.

Even when not only the gap layer 43 but also an inorganic insulation underlying layer 36 are formed between the coil layer 27 and the lower core layer 20, the withstand voltage cannot be improved due to the influence of defects such as pin holes or the like formed in the inorganic insulation underlying layer 36. Therefore, as shown in FIG. 10, an organic insulation underlying layer 31 is further provided between the lower core layer 20 and the coil layer 27. In this case, the pin holes formed in the inorganic insulation underlying layer 36 are appropriately filled with the organic insulation underlying layer 31 to improve the withstand voltage.

However, in the present invention, only the organic insulation underling layer 31 may be formed on the gap layer 43, or the inorganic insulation underlying layer 36 may be formed on the organic insulation underlying layer 31 formed on the gap layer 43. In either structure, the withstand voltage between the lower core layer 20 and the coil layer 27 can be improved.

In the present invention, the gap between the lower core layer 20 and the coil layer 27 is preferably in the range of 0.35 μm to 1.5 μm, the thickness of the inorganic insulation underlying layer 36 is preferably in the range of 0.15 μμm to 0.5 μm, and the thickness of the organic insulation underlying layer 31 is preferably in the range of 0.2 μμm to 1.0 μm.

The materials of the organic insulation underlying layer 31 and the inorganic insulation underlying layer 36 are the same as described above with reference to FIGS. 2 to 4.

As shown in FIG. 10, a Gd setting insulation layer 45 is formed on the gap layer 43 so that the gap depth (Gd) is determined by the length L3 from the front end surface of the Gd setting insulation layer 45 to the surface facing the recording medium.

The coil layer 27 is formed in a spiral pattern with the winding center 27a as a center, and is made of a nonmagnetic conductive material having low electric resistance, for example, such as Cu or the like.

As shown in FIG. 10, the upper surfaces of the coil insulation layer 44 and the coil layer 27 are formed in the same plane. In this case, the thickness of the coil layer 27 can be increased to the maximum limit within the thickness of the coil insulation layer 44. Therefore, even when the width dimension of the conductor of the coil layer is decreased, the coil resistance inversely proportional to the sectional area is not increased.

In order to form the upper surfaces of the coil insulation layer 44 and the coil layer 27 in the same plane, the upper surfaces of the coil insulation layer 44 and the coil layer 27 are polished by, for example, the CMP technique. As a result, the upper surfaces of the coil insulation layer 44 and the coil layer 27 are polished surfaces.

As shown in FIG. 10, assuming that the junction plane between the recording region 24 and the upper core layer 26 is reference plane A, the upper surfaces of the coil insulation layer 44 and the coil layer 27 are preferably located in the same plane as the reference plane A. In this case, the thickness of the coil layer 27 can be increased to the maximum limit within the step between the recording region 24 and the lower core layer 20, and thus the width direction of the coil layer 27 can be appropriately decreased without causing an increase in the coil resistance value inversely proportional to the sectional area.

The coil insulation layer 44 comprises an inorganic insulation layer made of an inorganic material. As the inorganic material, at least one material is preferably selected from AlO, $SiO_2$, $Ta_2O_5$, TiO, AlN, AlSiN, TiN, SiN, $Si_3N_4$, NiO, WO, $WO_3$, BN, CrN, SiON, and AlSiO.

As shown in FIG. 10, an insulation layer 32 made of an organic material such as a resist or polyimide is formed on the coil layer 27 and the coil insulation layer 44, and a second coil layer 33 is formed in a spiral patter on the insulation layer 32. The winding center 33a of the second coil layer 33 is magnetically connected directly to the winding center 27a of the first coil layer 27 which is formed so that the upper surface lies on the same plane as the junction plane (the reference plane A) between the recording region 14 and the upper core layer 26.

As shown in FIG. 10, the second coil layer 33 is covered with an insulation layer 34 made of an organic material such as resist or polyimide, and the upper core layer 26 made of a magnetic material such as permalloy or the like is formed on the insulation layer 34 by frame plating or the like.

As shown in FIG. 10, the front end 26a of the upper core layer 26 is formed in contact with the top of the recording region 24, and the base end 26b is connected directly to the top of a lifting layer (back gap layer) 35 formed on the lower core layer 20 and mage of a magnetic material. However, the lifting layer 35 is not necessarily formed. In this case, the base end 26b of the upper core layer 26 is extended to the top of the lower core layer 20 to be magnetically connected directly to the lower core layer.

In each of the above-described inductive heads shown in FIGS. 1 to 10, when a recording current is supplied to the coil layer 27 and the second coil layer 33, a recording magnetic field is induced in the lower core layer 20 and the upper core layer 26 so that a magnetic signal can be recorded on the recording medium such as a hard disk by a leakage magnetic field between the pole layers respectively connected directly to the upper core layer 26 and the lower core layer 20, or between the pole layer connected to one of the core layers and the other core layer.

In the present invention, as shown in FIGS. 2, 3, 4, 6, 8 and 10, the organic insulation underlying layer 31 is formed between the lower core layer 20 and the coil layer 27, or the two layers including the organic insulation underlying layer 31 and the inorganic insulation underlying layer 36 are formed between the lower core layer 20 and the coil layer 27.

In a conventional magnetic head, only the inorganic insulation underlying layer 36 is formed between the lower core layer 20 and the coil layer 27 to secure the withstand voltage between the lower core layer 20 and the coil layer 27 by the one layer. However, in fact, defects such as pin holes or the like easily occur in the thin inorganic insulation underlying layer 36, thereby causing a decrease in withstand voltage.

In the present invention, as described above, the organic insulation underlying layer 31 is further provided between the lower core layer 20 and the coil layer 27 to prevent the occurrence of pin holes or the like due to the stickiness peculiar to the organic insulating material, and prevent contamination with impurities during the formation of the organic insulation underlying layer 31. It is thus possible to further improve the withstand voltage between the lower core layer 20 and the coil layer 27 as compared with a conventional magnetic head.

However, the organic insulation underlying layer 31, or the insulation underlying layer having the two layer structure comprising the organic insulation underlying layer 31 and the inorganic insulation underlying layer 31 should not have an excessively large thickness. In the present invention, the gap between the lower core layer 20 and the coil layer 27, i.e., the thickness of the insulation underlying layer, is preferably in the range of 0.35 $\mu$m to 1.5 $\mu$m. This numerical range is substantially the same as the thickness of the inorganic insulation underlying layer 36 formed between the lower core layer 20 and the coil layer 27 in a conventional example.

With such a thin insulation underlying layer, the thick coil layer 27 can be formed on the insulation underlying layer.

Therefore, the width dimension T4 of the coil layer 27 can be decreased, and the magnetic path ranging from the lower core layer 20 to the upper core layer 27 can be shortened to decrease inductance, thereby permitting the manufacture of a thin film magnetic head adaptable to a hither recording density in future.

As shown in FIGS. 2, 3, 4, 6, 8, and 10, the coil has the two layer structure.

The reason why the coil has the two layer structure is that the number of the coil turns is distributed between the first coil layer 27 and the second coil layer 33 to further decrease the width dimension T4 of the coil layer 27, further shortening the magnetic path ranging from the lower core layer to the upper core layer 26. Therefore, the inductance can be further decreased, thereby permitting the manufacture of a thin film magnetic head adaptable to a higher recording density in future. However, the coil may comprise only the coil layer 27.

The front end of the upper core layer 26 may be exposed in the surface facing the recording medium, or may be retracted from the surface facing the recording medium, as shown in FIGS. 2, 3, 4 and 10. The front end of the upper core layer 26 is preferably retracted because a leakage magnetic field less occurs from the upper core layer 26 to properly prevent side fringing, causing usefulness for the write performance within the track width Tw.

FIGS. 11 to 20 show the steps for manufacturing the thin film magnetic head shown in FIG. 4.

Figure 11:
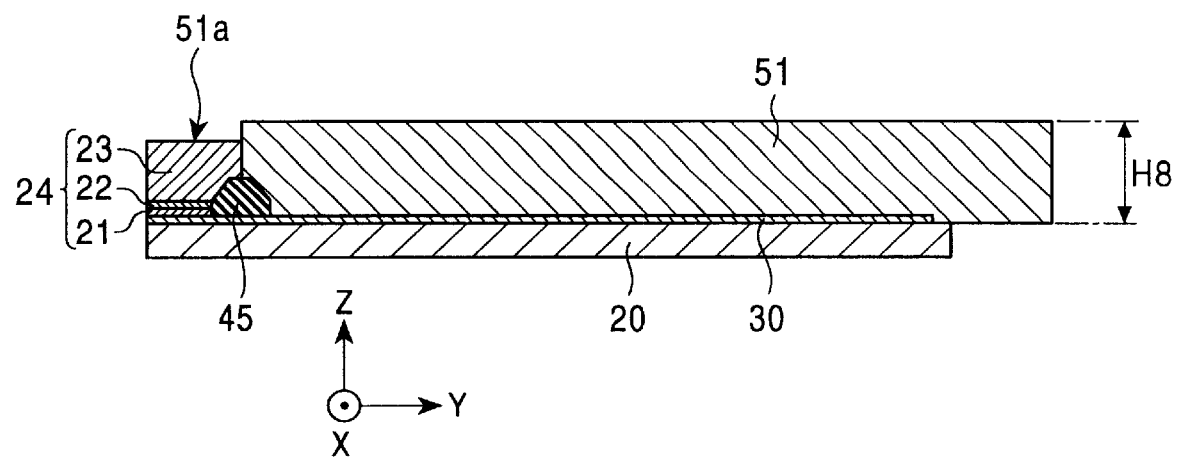
FIG. 11 is a drawing showing a step of a method of manufacturing the thin film magnetic head shown in FIG. 4.

As shown in FIG. 11, the plated underlying layer 30 made of a magnetic material such as permalloy or the like is first formed on the lower core layer 20, the Gd setting insulation layer 45 for determining the gap depth is formed, and then a resist layer 51 is formed by coating on the plated underlying layer 30. The thickness H8 of the resist layer 51 should be larger than at least the thickness dimension H4 of the recording region 24 in the thin film magnetic head shown in FIG. 1.

Next, a trench 51a is formed in the resist layer 51 by exposure and development to have a predetermined length dimension from the surface facing the recording medium and a predetermined width dimension in the track width direction (the X direction shown in the drawing), and the recording region 24 is formed in the trench 51a.

The recording region 24 shown in FIG. 11 comprises the lower pole layer 21, the gap layer 22 and the upper pole layer 23, which are continuously formed by plating from the bottom.

The film structure of the recording region 24 formed in the trench 51a is not limited to the three-layer structure. Namely, the recording region 24 may comprise the lower pole layer 21 and the nonmagnetic gap layer 22, or the nonmagnetic gap layer 22 and the upper pole layer 23. Each of the pole layers 21 and 23, and the gap layer 22 may comprise a single layer film or a multilayer film.

The gap layer 22 is preferably formed by plating together with the pole layers 21 and 23, and as the nonmagnetic metal material for forming the gap layer 22, which can be plated, at least one material is preferably selected from NiP, NiPd, NiW, NiMo, Au, Pt, Rh, Pd, Ru, Cr, and NiCu.

Figure 12:
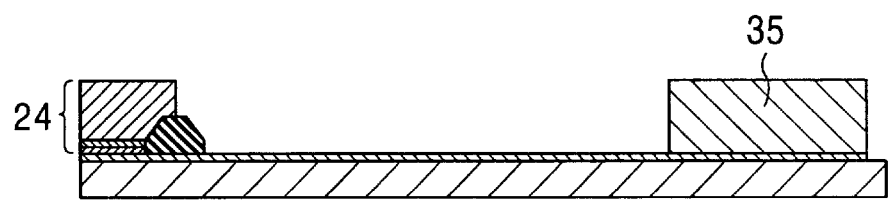
FIG. 12 is a drawing showing the step after the step shown in FIG. 11.

FIG. 12 shows the state in which the resist layer 51 is removed, and the recording region 24 is formed on the lower core layer 20 near the ABS, and in some cases, the lifting layer 35 is formed at a distance from the recording region 24 in the height direction after the recording region 24 is formed.

The width dimension of the recording region 24 shown in FIG. 12 can be decreased by grinding both sides (the sides in the X direction shown in the drawing) by ion milling in the track width direction (the X direction). The width dimension of the recording region 24 ground by ion milling is defined as the track width Tw.

The upper surface of the lower core layer 20, which extends from the base end of the lower pole layer 21, is also ground by the ion milling in the track width direction (the X direction shown in the drawing) to form the inclined surfaces 20b at the top of the lower core layer 20, as shown in FIG. 1.

Figure 13:
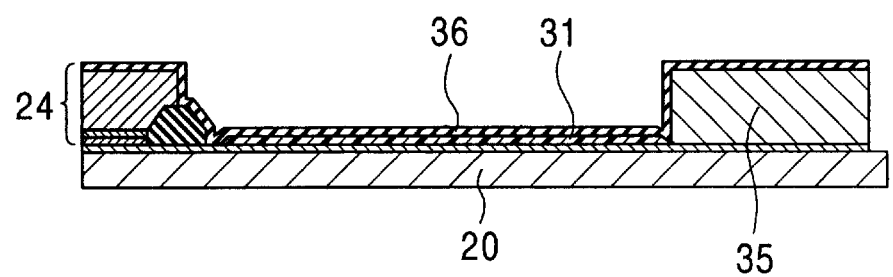
FIG. 13 is a drawing showing the step after the step shown in FIG. 12.

Next, in the step shown in FIG. 13, the organic insulation underlying layer 31 made of an organic insulating material is formed on the lower core layer 20. The thickness of the organic insulation underlying layer 31 is preferably in the range of 0.2 µm to 1.0 µm, and a resist or polyimide is preferably used as the organic insulating material.

Then, the inorganic insulation underlying layer 36 made of an inorganic insulating material is formed on the organic insulation underlying layer 31 and the lifting layer 35. The thickness of the inorganic insulation underlying layer 36 is preferably in the range of 0.15 µm to 0.6 µm, and as the inorganic insulating material, at least one material is preferably selected from AlO, $Al_2O_3$, $SiO_2$, $Ta_2O_5$, TiO, AlN, AlSiN, TiN, SiN, $Si_3N_4$, NiO, WO, $WO_3$, BN, CrN, SiON, and AlSiO.

The inorganic insulation underlying layer 36 is formed by an existing method such as sputtering or the like not only on the organic insulation underlying layer 31 but also on the recording region 24 and the lifting layer 35.

The total thickness of the inorganic insulation underlying layer 36 and the organic insulation underlying layer 31 is preferably in the range of 0.35 µm to 1.5 µm. With a thickness smaller than the numerical range, the withstand voltage cannot be appropriately improved, while with a thickness larger than the numeral range, the thickness of the coil layer 27 formed on the inorganic insulation underlying layer 36 should be decreased to increase the width dimension of the coil layer 27, thereby causing the problem of lengthening the magnetic path.

As shown in FIG. 13, the organic insulation underlying layer 31 is partly formed on the lower core layer 20. In the present invention, the organic insulation underlying layer 31 is used for improving the withstand voltage between the lower core layer 20 and the coil layer 27, which will be described below. Therefore, the organic insulation underlying layer 31 is formed only on the lower core layer 20, and can be easily formed in the predetermined range because of the formation by coating.

In the step shown in FIG. 13, the inorganic insulation underlying layer 36 may be first formed, and then the organic insulation underlying layer 31 may be formed on the inorganic insulation underlying layer 31. In this case, the thin film magnetic head shown in FIG. 3 is formed.

Alternatively, only the organic insulation underlying layer 31 may be formed on the lower core layer 20. In this case, the thin film magnetic head shown in FIG. 2 is formed.

Figure 14:
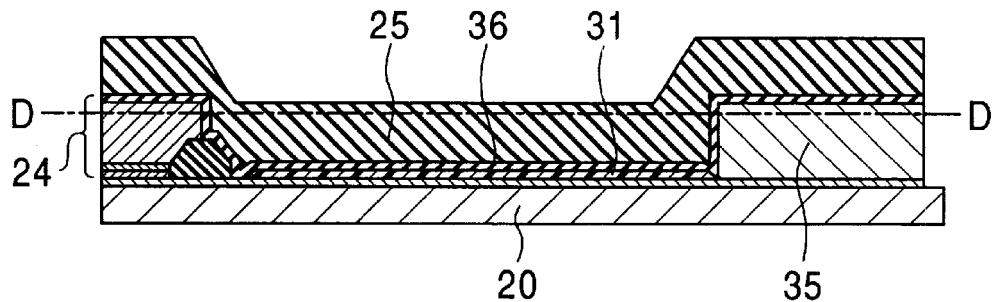
FIG. 14 is a drawing showing the step after the step shown in FIG. 13.

Next, as shown in FIG. 14, the coil insulation layer 25 is formed on the organic insulation underlying layer 31, the recording region 24 and the lifting layer 35.

However, the coil insulation layer 25 may be partly formed on the portion the lower core layer 20 between the recording region 24 and the lifting layer 35 by using, for example, resist or the like. In this case, the step shown in FIG. 15 is unnecessary, and the process proceeds to the step shown in FIG. 16.

Figure 15:
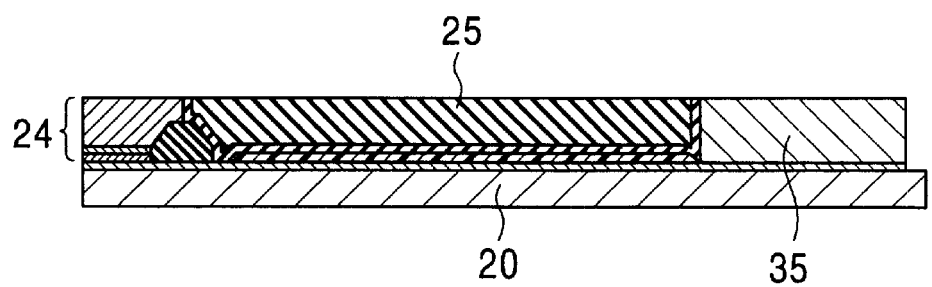
FIG. 15 is a drawing showing the step after the step shown in FIG. 14.

Next, the coil insulation layer 25 is polished by the CMP technique to the line D—D shown in FIG. 14 to expose the surface of the recording region 24 so that the upper surfaces of the coil insulation layer 25 and the recording region 24 lie in the same plane, as shown in FIG. 15.

Figure 16:
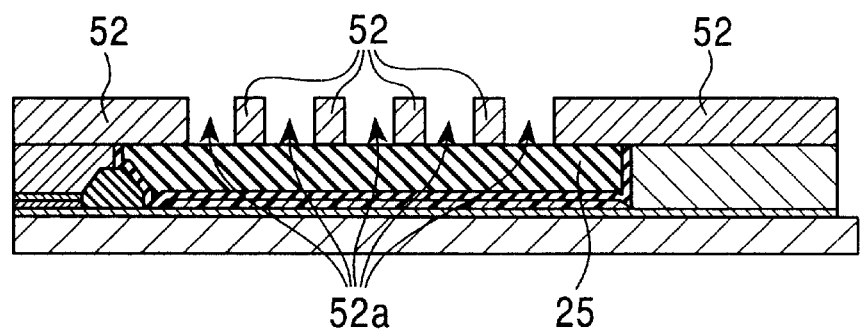
FIG. 16 is a drawing showing the step after the step shown in FIG. 15.
Figure 17:
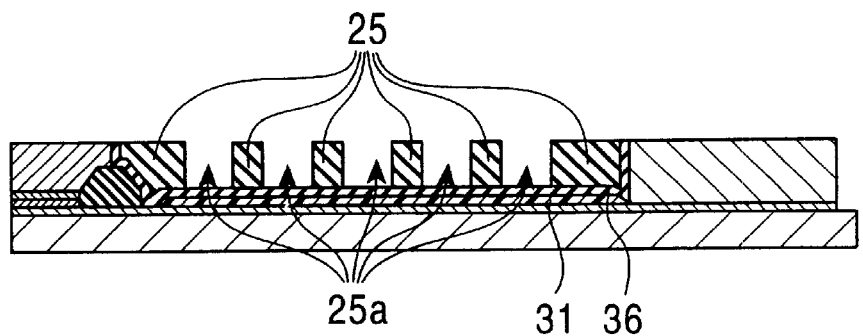
FIG. 17 is a drawing showing the step after the step shown in FIG. 16.

In the step shown in FIG. 16, a resist layer 52 is coated on the surface of the coil insulation layer 25 planarized by using the CMP technique, and a coil pattern 52a is formed in the resist layer 52 by exposure and development.

Next, the surfaces of the portions of the coil insulation layer 25, which are exposed from the coil pattern 52a formed in the resist layer 52, are removed by reactive ion etching or the like to form the coil forming grooves 25a in the coil insulation layer 25, which have substantially the same pattern as the coil pattern 52a formed in the resist layer 52. Then, the resist layer 52 is removed to create the state shown in FIG. 17.

In this step, the etching time should be appropriately controlled to form the concave coil forming grooves 25a in the portions of the coil insulation layer 25, which are exposed from the coil pattern 52s of the resist layer 52, until the surface of the inorganic insulation underlying layer 36 is exposed.

The inorganic insulation underlying layer 36 is provided for securing magnetic isolation between the lower core layer 20 and the coil layer 27. However, in the present invention, in etching the coil insulation layer 25, the inorganic insulation underlying layer 36 also functions as a stopper layer for preventing excessive etching.

For example, with the insulation 25 made of $SiO_2$, and the inorganic insulation underlying layer 36 made of $Al_2O_3$, in the use of $CF_4$ gas, the RIE rate ratio of both layers is 20:1, and thus the inorganic insulation underlying layer 36 sufficiently functions as the stopper layer.

Figure 18:
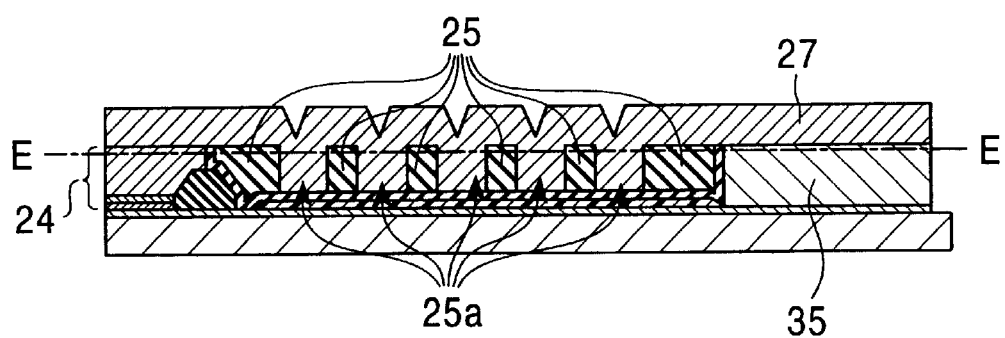
FIG. 18 is a drawing showing the step after the step shown in FIG. 17.
Figure 19:
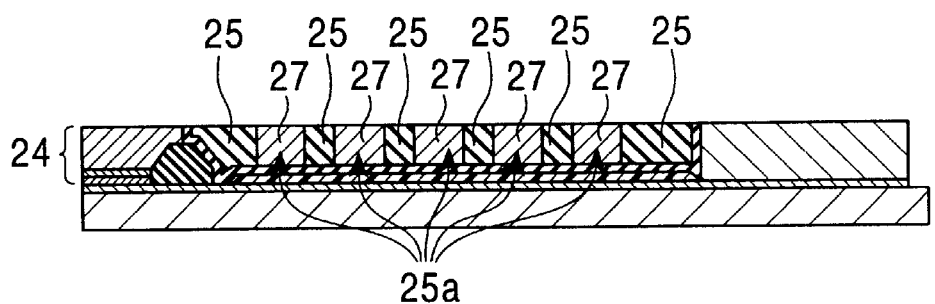
FIG. 19 is a drawing showing the step after the step shown in FIG. 18.

In the step shown in FIG. 18, the coil forming grooves 25a formed in the coil insulation layer 25 are filled with a conductive material such as Cu or the like to form the coil layer 27 in the coil forming grooves 25a. In FIG. 18, the coil layer 27 is formed on the recording region 24, the coil insulation layer 25 and the lifting layer 35. Namely, in the coil layer 27, the conductor embedded in the coil forming grooves 25a continues above the coil insulation layer 25. However, the coil layer 27 may be partly formed only in the coil forming grooves 25a.

The coil forming grooves 25a formed in the coil insulation layer 25 can be filled with the coil layer 27 by using a conventional method, for example, such as electroplating, sputtering, or CVD.

Next, as shown in FIG. 18, the coil layer 27 projecting upward from the coil insulation layer 25 is removed, and ground to line E—E by, for example, the CMP technique or the like so that the conductor of the coil layer 27 is contained only in the coil forming grooves 25a. As a result, the coil layer 27 is contained only in the coil forming grooves 25a formed in the coil insulation layer 25. In this step, assuming that the upper surface of the recording region 24 is a reference plane, the upper surfaces of the coil insulation layer 25 and the coil layer 27 lie in the same plane as the reference plane. As shown in FIG. 18, the surface of the coil insulation layer 25 is ground accompanying grinding of the coil layer 27 to the line E—E to create the state shown in FIG. 19.

As described above, in FIG. 19, the coil forming grooves 25a formed in the coil insulation layer 25 are filled with the coil layer 27, and assuming that the upper surface of the recording region 24 is the reference plane, the upper surfaces of the coil insulation layer 25 and the coil layer 27 lie in the same plane as the reference plane.

Figure 20:
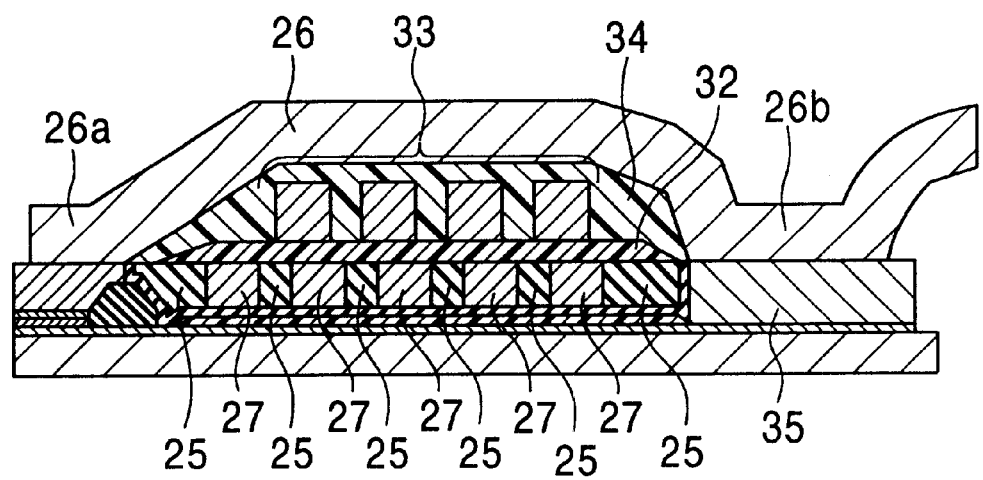
FIG. 20 is a drawing showing the step after the step shown in FIG. 19.

Then, as shown in FIG. 20, the insulation layer 32 is formed on the coil insulation layer 25 and the coil layer 27. When the second coil layer 33 is formed, the second coil layer 33 is patterned on the insulation layer 32 by using frame plating, and then coated with the insulation layer 34. Then, the upper core layer 26 is formed on the recording region 24 and the insulation layer 34. In forming the upper core layer 26, as shown in FIG. 20, the front end 26a of the upper core layer 26 is connected directly to the top of the recording region 24, and the base end 26b is connected directly to the top of the lifting layer 35.

In the thin film magnetic head shown in FIG. 20, assuming that the junction plane between the recording region 24 and the upper core layer 26 is the reference plane, the upper surfaces of the coil layer 27 and the coil insulation layer 25 lie in the same plane as the reference plane. This is achieved by grinding the surfaces of the coil layer 27 and the coil insulation layer 25 by the CMP technique to the reference plane in the steps shown in FIGS. 14 and 18.

For example, in the steps shown in FIGS. 14 and 18, if the coil insulation layer 25 and the coil layer 27 can be appropriately formed only at the predetermined positions by using resist of the like, the upper surfaces of the coil insulation layer 25 and the coil layer 27 need not be ground by the CMP technique. In this case, the surfaces of the coil insulation layer 25 and the coil layer 27 need not be located in the same plane as the reference plane.

Figure 21:
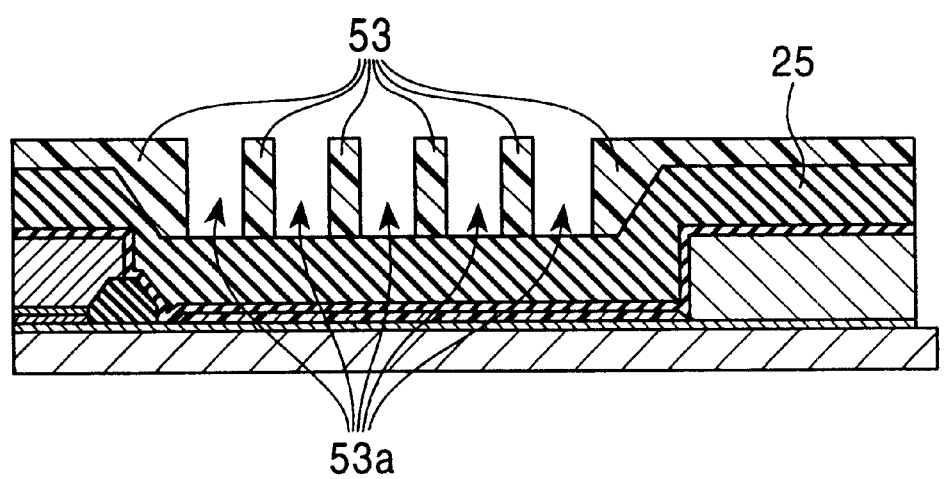
FIG. 21 is a drawing showing a step of another method of manufacturing the thin film magnetic head shown in FIG. 4.
Figure 22:
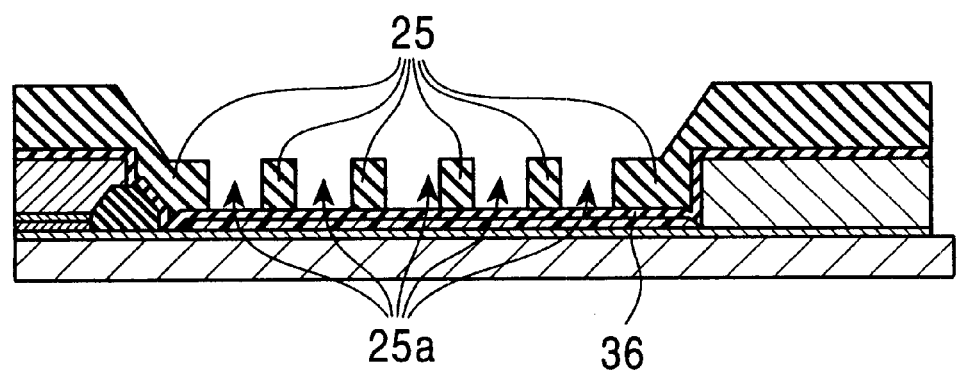
FIG. 22 is a drawing showing the step after the step shown in FIG. 21.
Figure 23:
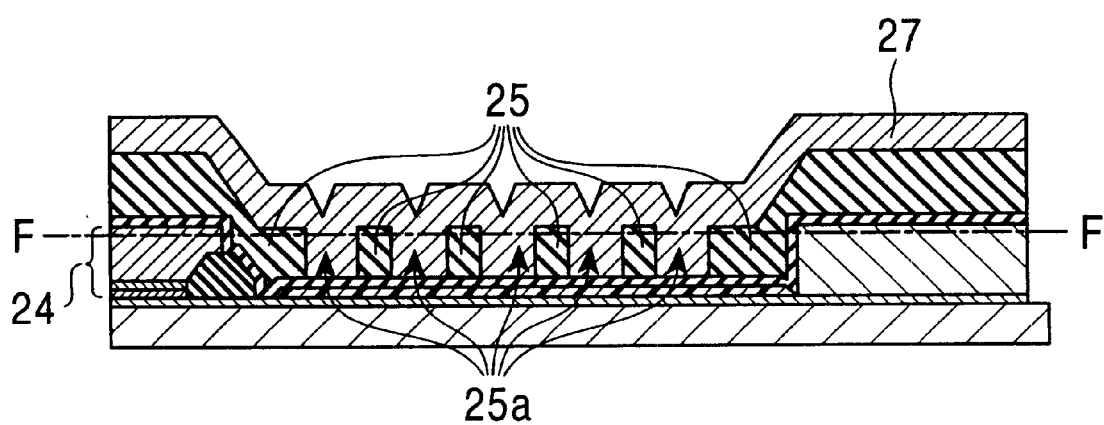
FIG. 23 is a drawing showing the step after the step shown in FIG. 22.

FIGS. 21 to 23 are drawings showing the steps of another method of manufacturing the thin film magnetic head shown in FIG. 4. In the steps shown in FIGS. 21 to 23, the steps shown in FIGS. 11 to 20 are partly changed, and thus description will be made with reference to FIGS. 21 to 23 and some of the steps shown in FIGS. 11 to 20.

As shown in FIGS. 11 and 12, the recording region 24 is formed on the lower core layer 20 by using the resist layer 51, and then the lifting layer 35 is formed. Then, as shown in FIG. 13, the organic insulation underlying layer 31 is formed on the lower core layer 20, and the inorganic insulation underlying layer 36 is further formed on the recording region 24, the organic insulation underlying layer 31 and the lifting layer 35 by sputtering or the like.

By forming the organic insulation underlying layer 31, the withstand voltage between the coil layer 27 and the lower core layer 20 can be improved. The materials and the thicknesses of the organic insulation underlying layer 31 and the inorganic insulation underlying layer 36 are the same as described above with reference to FIG. 13.

Next, as shown in FIG. 21, a resist layer 53 is coated on the coil insulation layer 25, and a coil pattern 53a is formed in the resist layer 53 by exposure and development.

Next, the portions of the coil insulation layer 25 exposed from the coil pattern 53a formed in the resist layer 53 are removed by reactive ion etching to form the coil forming grooves 25a having the same pattern as the coil pattern 53a formed in the resist layer 53. FIG. 22 shows the state after the resist layer 53 is removed.

As shown in FIG. 22, the etching time should be appropriately controlled to form the coil forming grooves 25a in the coil insulation layer 25 until the inorganic insulation underlying layer 36 is exposed.

The inorganic insulation underlying layer 36 is provided for securing magnetic isolation between the lower core layer 20 and the coil layer 27 to improve, particularly, the withstand voltage. However, in the present invention, in etching the coil insulation layer 25, the inorganic insulation underlying layer 36 also functions as a stopper layer for preventing excessive etching.

In the step shown in FIG. 23, the coil forming grooves 25a formed in the coil insulation layer 25 are filled with a conductive material to form the coil layer 27. In FIG. 23, the coil layer 27 is formed on the recording region 24, the coil insulation layer 25, and the lifting layer 35. As described above, the coil layer 27 is formed by electroplating, sputtering, CVD, or the like.

As shown in FIG. 23, the coil layer 27 is ground to the line F—F by using, for example, the CMP technique. By grinding the coil layer 27 to the line F—F, the conductor of the coil layer 27 is contained only in the coil forming grooves 25a. Assuming that the upper surface of the recording region 24 is a reference plane, the upper surfaces of the coil insulation layer 25 and the coil layer 27 lie in the same plane as the reference plane. The surface of the coil insulation layer 25 is also ground accompanying grinding of the coil layer 27 to the line F—F to create the same state as FIG. 19. Then, like in the step shown in FIG. 20, the insulation layer 32, the second coil layer 33, the insulation layer 34, and the upper core layer 26 are formed.

In manufacturing the thin film magnetic head shown in FIG. 4 by using the steps shown in FIGS. 21 to 23, the step of grinding the predetermined layer by using the CMP technique shown in FIG. 23 is performed only once, thereby simplifying the manufacturing process.

FIGS. 24 to 27 show the steps of still another method of manufacturing the thin film magnetic head shown in FIG. 3.

Figure 24:
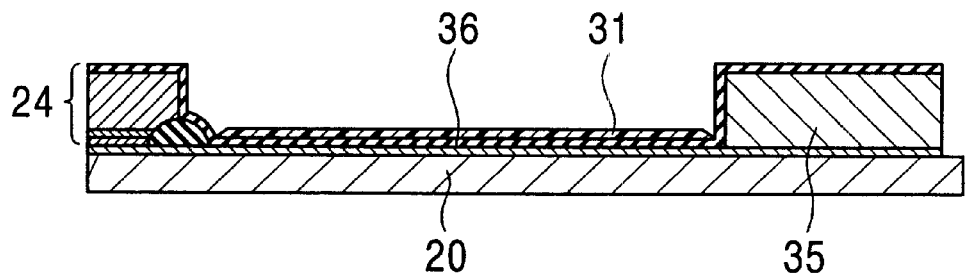
FIG. 24 is a drawing showing a step of still another method of manufacturing the thin film magnetic head shown in FIG. 3.

FIG. 24 shows the same step as FIG. 13, i.e., the step of forming the recording region 24 and the lifting layer 35 on the lower core layer 20, and then forming the inorganic insulation underlying layer 36 and the organic insulation underlying layer 31. In the present invention, the inorganic insulation underlying layer 36 may be formed on the organic insulation underlying layer 31 previously formed, or only the organic insulation underlying layer 31 may be formed.

Figure 25:
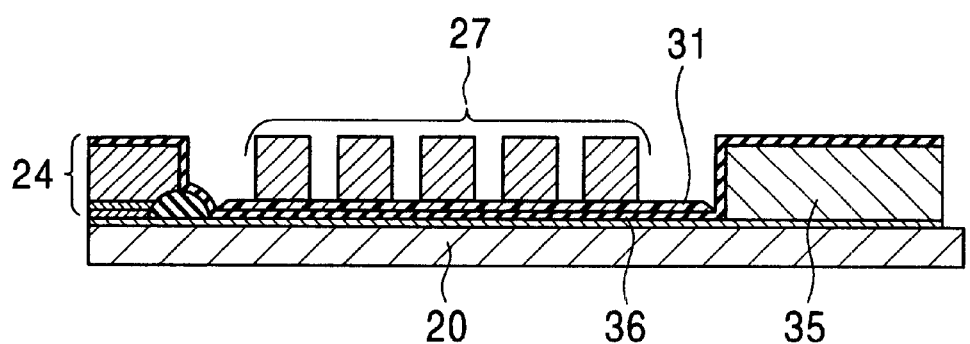
FIG. 25 is a drawing showing the step after the step shown in FIG. 24.

In the step shown in FIG. 25, the coil layer 27 is patterned on the organic insulation underlying layer 31. The upper surface of the coil layer is preferably located at substantially the same height as or higher than the upper surface of the recording region 24. However, when a thin coil may be formed, the coil layer 27 may be lower than the recording region 24. Since the coil pitch depends upon the necessary coil thickness, with a small number of turns, the coil width is increased, and thus the coil height is not necessarily required.

Figure 26:
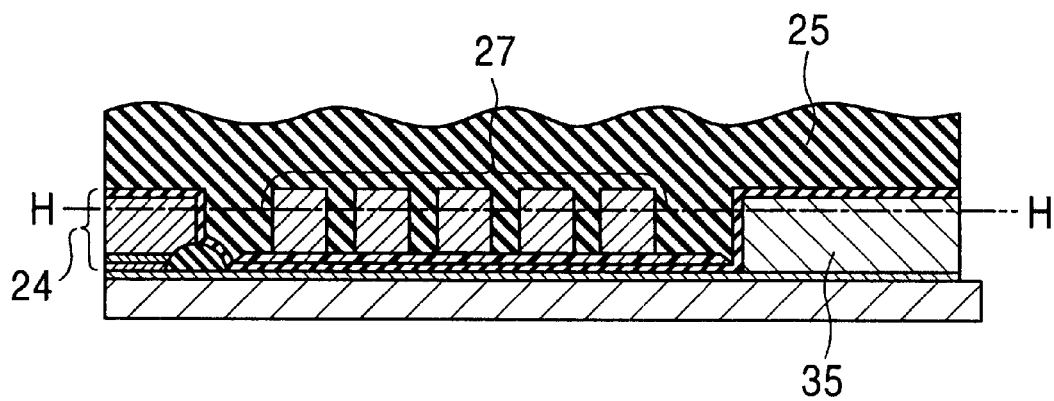
FIG. 26 is a drawing showing the step after the step shown in FIG. 25.

Next, the pitch intervals of the conductor of the coil layer 27 are filled with the coil insulation layer 25. If the coil insulation layer 25 can be partially formed in the pitch intervals, the polishing step by the CMP technique is unnecessary. However, it is actually difficult to form the coil insulation layer 25 only in the pitch intervals, and thus the coil insulation layer 25 is formed on the coil layer 27, the recording region 24, and the lifting layer 35, as shown in FIG. 26.

Although not shown in the drawings, the pitch intervals of the conductor of the coil layer 27 may be first filled with the organic insulating material, and then the coil insulation layer may be formed on the organic insulating material layer. However, in this case, the height of the organic insulating material layer is preferably lower than the line H—H shown in FIG. 26. With the organic insulating material layer higher than the line H—H, in the next step of polishing the organic insulating material layer by the CMP technique, it is difficult to polish the organic insulating material layer due to the stickiness peculiar to the organic material. Therefore, the organic insulating material layer is formed to a height lower than the line H—H.

Then, the coil insulation layer 25 is polished to the line H—H by the CMP technique. In this step, the upper surfaces of the coil layer 27 and the recording region 24 are also polished.

In this way, the recording region 24, the coil layer 27 and the coil insulation layer 25 are simultaneously polished to form the upper surfaces of the recording region 24, the coil layer 27 and the coil insulation layer 25 in the same plane. This state is shown in FIG. 27.

Figure 27:
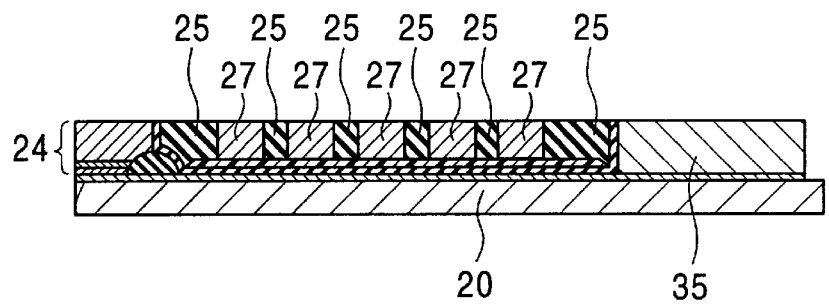
FIG. 27 is a drawing showing the step after the step shown in FIG. 26.

As shown in FIG. 27, the pitch intervals of the conductor of the coil layer 27 are filled with the coil insulation layer 25.

Like in the step shown in FIG. 20, the insulation layer 32 is formed on the coil layer 27 and the coil insulation layer 25, the second coil layer 33 is further formed on the insulation layer 32, the insulation layer 34 is coated on the second coil layer 33, and then the upper core layer 26 is formed on the insulation layer 34.

FIGS. 28 to 35 are partial drawings showing the steps of a method of manufacturing the thin film magnetic head shown in FIG. 6.

Figure 28:
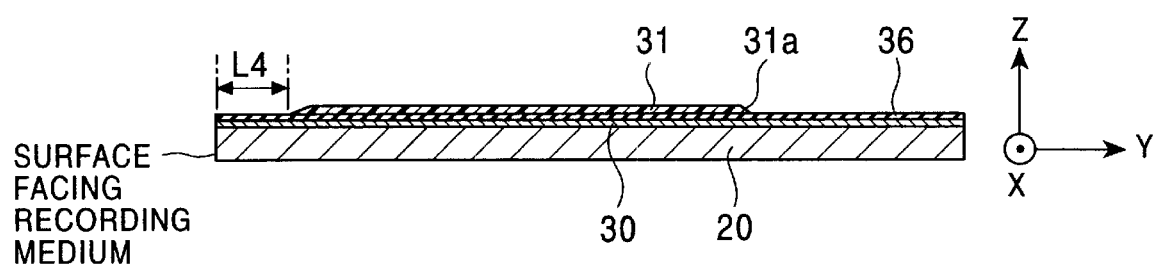
FIG. 28 is a drawing showing a step of a method of manufacturing the thin film magnetic head shown in FIG. 6.

In FIG. 28, a plated underlying layer 30 is formed on a lower core layer 20, and an inorganic insulation underlying layer 36 is formed on the plated underlying layer 30. The thickness of the inorganic insulation underlying layer 36 is preferably in the range of 0.15 $\mu$m to 0.5 $\mu$m. For the inorganic insulation underlying layer 36, at least one inorganic insulating material is preferably selected from AlO, $Al_2O_3$, $SiO_2$, $Ta_2O_5$, TiO, AlN, AlSiN, TiN, SiN, $Si_3N_4$, NiO, WO, $WO_3$, BN, CrN, SiON, and AlSiO.

As shown in FIG. 28, an organic insulation underlying layer 31 is formed on the inorganic insulation underlying layer 36. The thickness of the organic insulation underlying layer 31 is preferably in the range of 0.2 $\mu$m to 1.0 $\mu$m. For the organic insulation underlying layer 31, resist or polyimide is preferably used.

As shown in FIG. 28, the organic insulation underlying layer 31 is formed with a predetermined distance L4 from the surface facing the recording medium in the height direction (the Y direction shown in the drawing). The distance L4 is determined to be substantially the same as or longer than the length dimension of the recording region 24 so that the recording region 24 is formed in the portion with the distance L4.

In the manufacturing method, the organic insulation underlying layer 31 is formed over the entire surface of the inorganic insulation underlying layer 36, and then exposed and developed to leave the organic insulation underlying layer 31 only in the predetermined portion.

However, the organic insulation underlying layer 31 may be formed over the entire surface of the inorganic insulation underlying layer 36.

The organic insulation underlying layer 31 is formed with a predetermined length dimension in the height direction (the Y direction shown in the drawing), and a lifting layer 35 or a portion of magnetic connection between the upper core layer 26 and the lower core layer 20 is formed behind the base end 31a of the organic insulation underlying layer 31 in the height direction. The length dimension of the organic insulation underlying layer 31 in the height direction is longer than the length dimension of the coil layer 27 between the recording region 24 and the lifting layer 35.

Figure 29:
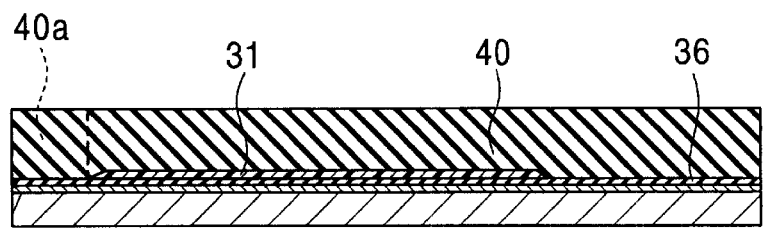
FIG. 29 is a drawing showing the step after the step shown in FIG. 28.

In the step shown in FIG. 29, a coil insulation layer 40 is formed on the organic insulation underlying layer 31 and the inorganic insulation underlying layer 36. Then, a trench 40a is formed with a predetermined length dimension in the height direction in the coil insulation layer 40. In the trench 40a, the inorganic insulation underlying layer 36 formed on the plated underlying layer is also ground. The width dimension of the trench 40a corresponds to the track width Tw.

Figure 30:
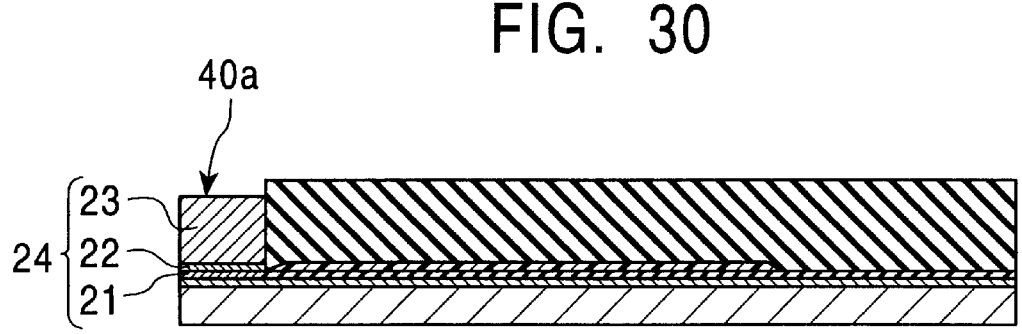
FIG. 30 is a drawing showing the step after the step shown in FIG. 29.

Then, the recording region 24 is formed in the trench 40a. As shown in FIG. 30, the recording region 24 comprises a lower pole layer 21, a gap layer 22 and an upper pole layer 23, which are continuously formed by plating.

The film structure of the recording region 24 formed in the trench 40a is not limited to the three layer structure. Namely, the recording region 24 may comprise the lower pole layer 21 and the nonmagnetic gap layer 22, or the non magnetic gap layer 22 and the upper pole layer 23. Each of the pole layers 21 and 23 and the gap layer 22 may comprise a single layer or a plurality of layers.

The gap layer 22 is preferably formed by plating together with the pole layers 21 and 23. As the nonmagnetic metal material which can be plated to form the gap layer 22, at least one material is preferably selected from NiP, NiPd, NiW, NiMo, NiRh, Au, Pt, Rh, Pd, Ru, Cr, and NiCu.

Then, a hole is formed in the coil insulation layer 40 at a position behind the recording region 24 in the height direction (the Y direction), and the lifting layer 35 is formed in the hole. Then, as shown in FIG. 31, a resist layer 54 is formed on the recording region 24, the coil insulation layer 40, and the lifting layer 35, and a coil pattern 54a is formed in the resist layer 54.

Figure 31:
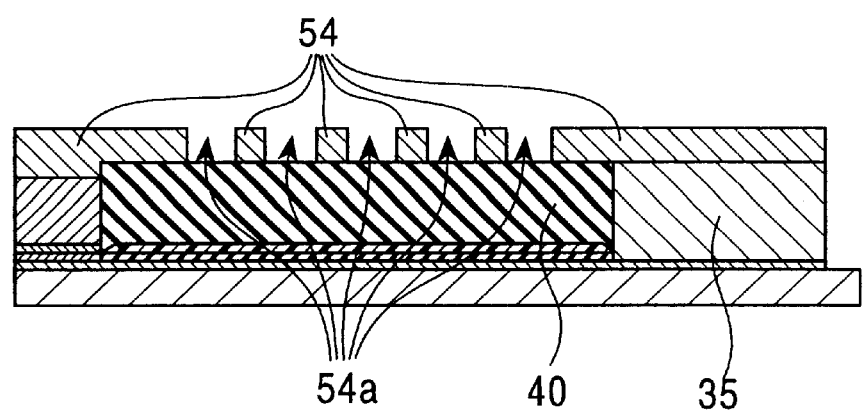
FIG. 31 is a drawing showing the step after the step shown in FIG. 30.

As shown in FIG. 31, the surface of the coil insulation layer 40 is exposed from the coil pattern 54a formed in the resist layer 54. The portions of the coil insulation layer 40, which are exposed from the coil pattern 54a, are removed by reactive ion etching or the like.

Figure 32:
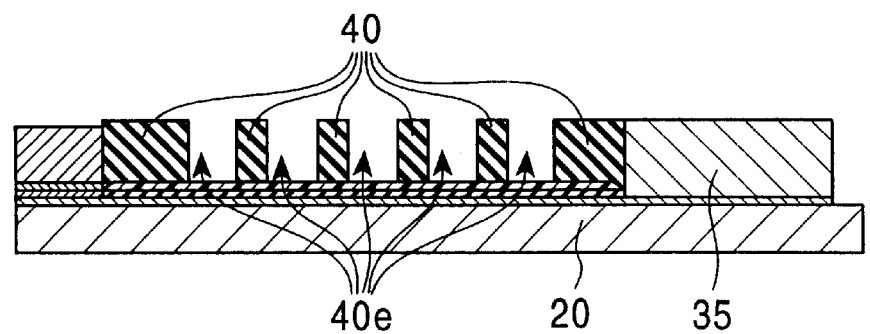
FIG. 32 is a drawing showing the step after the step shown in FIG. 31.

As a result, concave coil forming grooves 40e having substantially the same pattern and the coil pattern 54a formed in the resist layer 54 are formed. FIG. 32 shows the state after the resist layer 54 is then removed.

As shown in FIG. 32, the coil forming grooves 40e are formed in the coil insulation layer 40, and the organic insulation underlying layer 31 is exposed at the bottoms of the coil forming grooves 40e.

Although the organic insulation underlying layer 31 is provided for increasing the withstand voltage between the lower core layer 20 and the coil layer 27, the organic insulation underlying layer 31 also has the function as a stopper for preventing excessive cutting of the coil insulation layer 40 in the manufacturing method.

Figure 33:
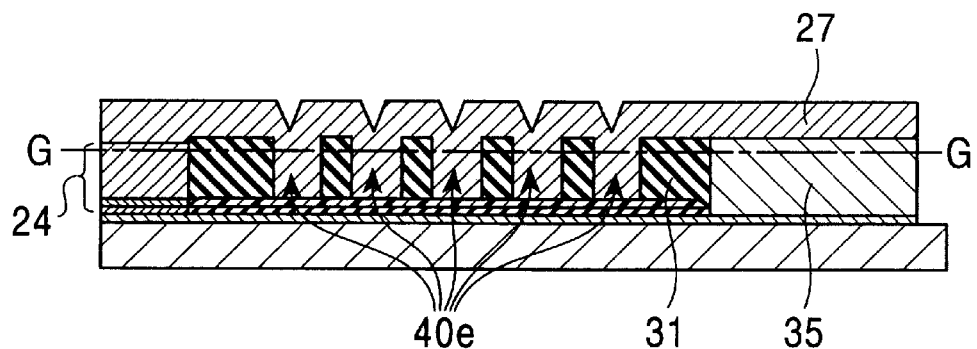
FIG. 33 is a drawing showing the step after the step shown in FIG. 32.

Next, as shown in FIG. 33, the coil forming grooves 40e formed in the coil insulation layer 40 are filled with a conductive material to form the coil layer 27. In the embodiment shown in FIG. 33, the coil layer 27 is formed on the recording region 24, the coil insulation layer 40, and the lifting layer 35. Therefore, the conductor of the coil layer 27, which is formed in the coil forming grooves 40e, continues above the coil insulation layer 40. The coil layer 27 can be formed by a conventional method such as electroplating, sputtering, CVD, or the like.

Next, as shown in FIG. 33, in order to form the coil layer 27 only in the coil forming grooves 40e, the coil layer 27 is ground to line G—G by, for example, the CMP technique. By grinding the coil layer 27 to the line G—G, on the assumption that the upper surface of the recording region 24 is a reference plane, the upper surfaces of the coil insulation layer 40 and the coil layer 27 can be located in the same plane as the reference plane.

Figure 34:
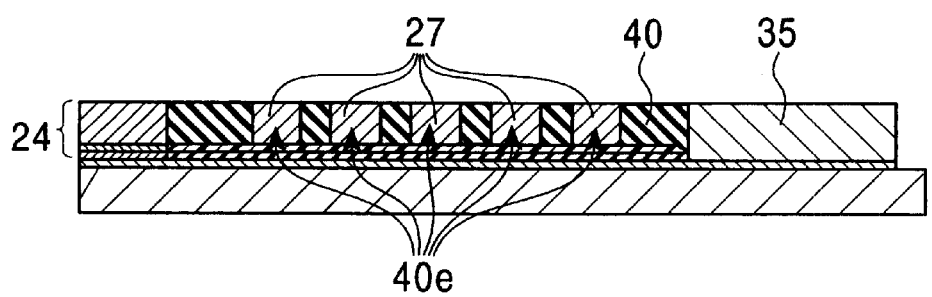
FIG. 34 is a drawing showing the step after the step shown in FIG. 33.

By grinding the coil layer 27 to the line G—G, as shown in FIG. 33, the surface of the coil insulation layer 40 is also ground. FIG. 34 shows the state after the coil layer 27 is ground to the line G—G.

As shown in FIG. 34, the coil insulation layer 40 is formed behind the recording region 24 in the height direction, and the coil forming grooves 40e are formed in the coil insulation layer 40. The coil forming grooves 40 are filled with the coil layer 27. As shown in FIG. 34, assuming that the upper surface of the recording region 24 is a reference plane, the upper surfaces of the coil insulation layer 40 and the coil layer 27 lie in the same plane as the reference plane.

Figure 35:
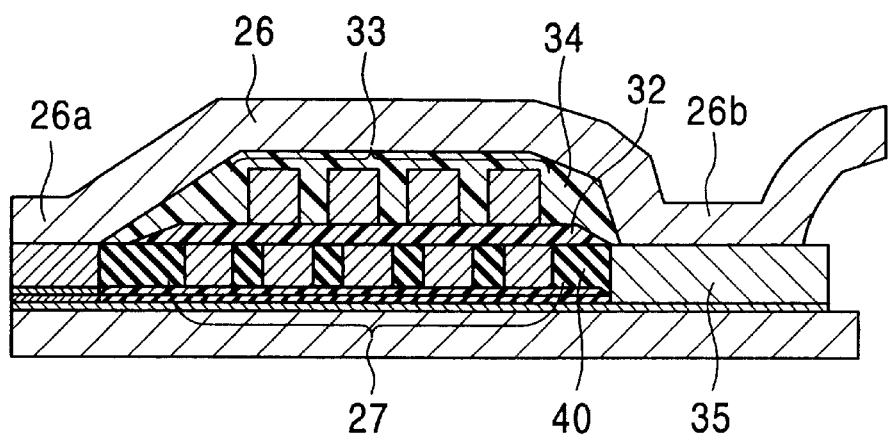
FIG. 35 is a drawing showing the step after the step shown in FIG. 34.
Figure 36:
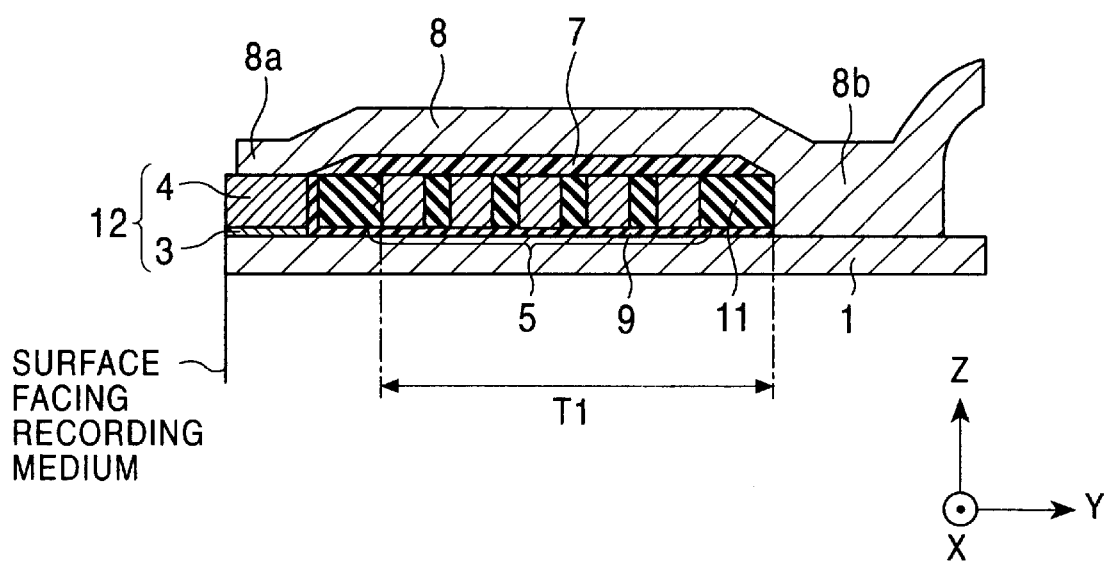
FIG. 36 is a partial sectional view showing the structure of a conventional thin film magnetic head.

Finally, as shown in FIG. 35, an insulation layer 32 is formed on the coil insulation layer 40 and the coil layer 27, and a second coil layer 33 is formed on the insulation layer 32. Then, an insulation layer 34 is formed on the second coil layer 33, and the upper core layer 26 is formed from the recording region 24 to the insulation layer 34 by frame plating or the like.

As shown in FIG. 35, the front end 26a of the upper core layer 26 is connected directly to the top of the recording region 24, and the base end 26b is connected directly to the top of the lifting layer 35.

In manufacturing the thin film magnetic head shown in FIG. 8, the same manufacturing method as that shown in FIGS. 28 to 35 is used.

A different lies in the point that two layers including a main coil insulation layer 41 and a sub-coil insulation layer 42 are laminated in the step shown in FIG. 29.

In the embodiment shown in FIG. 8, the etching rate of the main coil insulation layer 41 is higher than that of the sub-coil insulation layer 42.

First a trench having the inclined surface 42a shown in FIG. 7 is formed in the sub-coil insulation layer 42 by ion milling or the like using the difference between the etching rates, and then a trench 41a is formed in the portion of the main coil insulation layer 41, which is exposed from the trench formed in the sub-coil insulation layer 42, by a RIE method using the sub-coil insulation layer 42 as a mask. In this method, the trench 41a can be formed with an internal width dimension smaller than the resolution in exposure and development of resist, thereby permitting the manufacture of a thin film magnetic head adaptable to track narrowing.

For the thin film magnetic head shown in FIG. 10, a manufacturing method similar to the method shown in FIGS. 11 to 20, FIGS. 21 to 23, or FIGS. 24 to 27 is used.

A difference lies in the point that a gap layer 43 is formed over the entire surface of the lower core layer 20, and then an upper pole layer 46 is formed near the surface facing the recording medium by using a resist.

In the embodiment shown in FIG. 10, the gap layer 43 is preferably made of an inorganic insulating material, and as the inorganic insulating material, at least one material is preferably selected from $Al_2O_3$, $SiO_2$, SiON, AlN, AlSiN, AlSiN, and AlSiO.

After the upper pole layer 46 is formed, both sides of the upper pole layer 46 and the gap layer 43, and the surface of the lower core layer 20 may be ground to form a protrusion 20d integrally with the lower core layer 20, which projects from the top of the lower core layer 20 to the recording region 24, and which continues from the recording region 24. This can further suppress the occurrence of write fringing.

In each of the above-described method of manufacturing the thin film magnetic head of the present invention, the organic insulation underlying layer 31, or the organic insulation underlying layer 31 and the inorganic insulation underlying layer 36 can be formed between the lower core layer 20 and the coil layer 27, thereby permitting the thin film magnetic head having high withstand voltage between the lower core layer 20 and the coil layer 27.

In the present invention, the coil layer may comprise a single layer structure. In this case, the width dimension of the coil layer is increased due to the need to increase the number of turns of the coil layer in the first layer, and thus the magnetic path is lengthened from the viewpoint of shortening of the magnetic path, as compared with the two-layer structure coil layer. However, only the insulation layer 32 rises from the recording region 24, and thus the upper core layer 26 can be more precisely formed in the predetermined shape.

By retracting the front end of the upper core layer from the surface facing the recording medium, a leakage magnetic field from the upper core layer can be prevented to permit the manufacture of a thin film magnetic head causing no side fringing.

In the present invention, in the step shown in FIG. 12, both sides of the recording region 24 in the track width direction, which is formed on the lower core layer 20, can also be ground by ion milling. Therefore, in the present invention, the width dimension (=track width Tw) of the recording region 24 can be decreased to permit the manufacture of a thin film magnetic head adaptable to track narrowing. In the present invention, the track width Tw of the recording region 24 is preferably 0.7 $\mu$m or less, more preferably 0.6 $\mu$m or less.

As described in detail above, in a thin film magnetic head of the present invention, a recording region comprising a gap layer and a pole layer is formed on a lower core layer in the height direction from the surface facing a recording medium, and a coil layer is formed on the portion of the lower core layer, which is behind the recording region in the height direction. At least an organic insulation underlying layer is provided between the lower core layer and the coil layer to improve the withstand voltage between the lower core layer and the coil layer, thereby permitting the manufacture of a thin film magnetic head adaptable to a higher recording density in future.

In the present invention, an insulation underlying layer formed between the lower core layer and the coil layer may comprise a single organic insulation underlying layer, or a two layers including an organic insulation underlying layer and an inorganic insulation underlying layer.

In the formation of the organic insulation underlying layer on the inorganic insulation underlying layer, pin holes formed in the inorganic insulation underlying layer are filled with the organic insulation underlying layer, thereby appropriately improving the withstand voltage between the lower core layer and the coil layer.

In the manufacturing method of the present invention, the coil layer can be formed behind the recording region formed on the lower core layer in the height direction. It is thus possible to realize a short magnetic path ranging from the lower core layer to the upper core layer to decrease inductance, and at the same time, appropriately improve the withstand voltage between the lower core layer and the coil layer, thereby permitting the manufacture of a thin film magnetic head adaptable to a higher recording density in future.

What is claimed is:

1. A thin film magnetic head comprising a lower core layer, an upper core layer, a recording region comprising a pole layer and a gap layer located between the lower and upper core layers in the surface facing a recording medium; and
a coil layer formed on the rear portion of the lower core layer, which is behind the recording region in the height direction, for inducing a recording magnetic field in the lower core layer, the upper core layer and the recording region;
wherein at least an organic insulation underlying layer is interposed between the lower core layer and the coil layer,
wherein the coil layer comprises a conductor having pitch intervals filled with a coil insulation layer,
wherein the upper surfaces of the coil insulation layer and the coil layer are formed in the same plane, and
wherein assuming that the junction plane between the recording region and the upper core layer is a reference plane, the upper surfaces of the coil insulation layer and the coil layer are located in the same plane as the reference plane.

2. A thin film magnetic head according to claim 1, wherein an inorganic insulation underlying layer is formed on the lower core layer, the organic insulation underlying layer is formed on the inorganic insulation underlying layer, and the coil layer is formed on the organic insulation underlying layer.

3. A thin film magnetic head according to claim 2, wherein the inorganic insulation underlying layer is made of at least one inorganic insulating material of AlO, $Al_2O_3$, $SiO_2$, $Ta_2O_3$, TiO, AlN, AlSiN, TiN, SiN, $Si_3N_4$, NiO, WO, $WO_3$, BN, CrN, SiON, and AlSiO.

4. A thin film magnetic head according to claim 2, wherein the thickness of the inorganic insulation underlying layer is in the range of 0.15 $\mu$m to 0.5 $\mu$m.

5. A thin film magnetic head according to claim 1, wherein the organic insulation underlying layer is formed on the lower core layer, an inorganic insulation underlying layer is formed on the organic insulation underlying layer, and the coil layer is formed on the inorganic insulation underlying layer.

6. A thin film magnetic head according to claim 5, wherein the inorganic insulation underlying layer is made of at least one inorganic insulating material of AlO, $Al_2O_3$, $SiO_3$, $Ta_2O_3$, TiO, AlN, AlSiN, TiN, SiN, $Si_3N_4$, NiO, WO, $WO_3$, BN, CrN, SiON, and AlSiO.

7. A thin film magnetic head according to claim 5, wherein the thickness of the inorganic insulation underlying layer is in the range of 0.15 $\mu$m to 0.5 $\mu$m.

8. A thin film magnetic head according to claim 1, wherein the organic insulation underlying layer is made of a resist or polyimide.

9. A thin film magnetic head according to claim 1, wherein the thickness of the organic insulation underlying layer is in the range of 0.2 $\mu$m to 1.0 $\mu$m.

10. A thin film magnetic head according to claim 1, wherein the gap between the lower core layer and the coil layer is in the range of 0.35 $\mu$m to 1.5 $\mu$m.

11. A thin film magnetic head according to claim 1, wherein the upper surfaces of the coil insulation layer and the coil layer are polished surfaces.

12. A thin film magnetic head according to claim 1, wherein the coil insulation layer is made of an inorganic insulating material.

13. A thin film magnetic head according to claim 1, wherein an insulation layer is formed on the coil layer, and a second coil layer is formed on the insulation layer so as to be electrically connected to the coil layer, for inducing a recording magnetic field in the lower core layer, the upper core layer and the recording region.

14. A thin film magnetic head according to claim 1, wherein the recording region comprises a lower pole layer connected directly to the lower core layer, and a gap layer formed on the lower pole layer, an upper pole layer formed on the lower core layer with a gap layer provided therebetween to be connected directly to the upper core layer, or a lower pole layer connected directly to the lower core layer, and an upper pole layer formed on the lower core layer with a gap layer provided therebetween to be connected directly to the upper core layer.

15. A thin film magnetic head according to claim 14, wherein the gap layer is made of a nonmagnetic metal material which can be plated.

16. A thin film magnetic head according to claim 15, wherein as the nonmagnetic metal material, at least one material is selected from NiP, NiPd, NiW, NiMo, Au, Pt, Rh, Pd, Ru, Cr, and NiCu.

17. A thin film magnetic head according to claim 1, wherein the recording comprises a gap layer formed on the lower core layer, and an upper pole layer formed on the gap layer, or a gap layer which is formed on a protrusion formed integrally with the lower core layer to project toward the upper core layer, and an upper pole layer formed on the gap layer.

18. A thin film magnetic head according to claim 17, wherein the gap layer is made of an inorganic insulating material.

19. A thin film magnetic head according to claim 18, wherein as the inorganic insulating material, at least one material is preferably selected from $Al_2O_3$, $SiO_2$, SiON, AlN, AlSiN, and AlSiO.

20. A thin film magnetic head comprising a lower core layer, an upper core layer, a recording region comprising a pole layer and a gap layer located between the lower and upper core layers in the surface facing a recording medium; and
a coil layer formed on the rear portion of the lower core layer, which is behind the recording region in the height direction, for inducing a recording magnetic field in the lower core layer, the upper core layer and the recording region;
wherein at least an organic insulation underlying layer is interposed between the lower core layer and the coil layer,
wherein a coil insulation layer is formed on the lower core layer behind the recording region in the height direction and has coil forming grooves filled with the coil layer,
wherein the upper surfaces of the coil insulation layer and the coil layer are formed in the same plane, and
wherein assuming that the junction plane between the recording region and the upper core layer is a reference plane, the upper surfaces of the coil insulation layer and the coil layer are located in the same plane as the reference plane.

21. A thin film magnetic head according to claim 20, wherein an inorganic insulation underlying layer is formed on the lower core layer, the organic insulation underlying layer is formed on the inorganic insulation underlying layer, and the coil layer is formed on the organic insulation underlying layer.

22. A thin film magnetic head according to claim 21, wherein the inorganic insulation underlying layer is made of at least one inorganic insulating material of AlO, $Al_2O_3$, $SiO_2$, $Ta_2O_3$, TiO, AlN, AlSiN, TiN, SiN, $Si_3N_4$, NiO, WO, $WO_3$, BN, CrN, SiON, and AlSiO.

23. A thin film magnetic head according to claim 21, wherein the thickness of the inorganic insulation underlying layer is in the range of 0.15 μm to 0.5 μm.

24. A thin film magnetic head according to claim 20, wherein the organic insulation underlying layer is formed on the lower core layer, an inorganic insulation underlying layer is formed on the organic insulation underlying layer, and the coil layer is formed on the inorganic insulation underlying layer.

25. A thin film magnetic head according to claim 24, wherein the inorganic insulation underlying layer is made of at least one inorganic insulating material of AlO, $Al_2O_3$, $SiO_2$, $Ta_2O_3$, TiO, AlN, AlSiN, TiN, SiN, $Si_3N_4$, NiO, WO, $WO_3$, BN, CrN, SiON, and AlSiO.

26. A thin film magnetic head according to claim 24, wherein the thickness of the inorganic insulation underlying layer is in the range of 0.15 μm to 0.5 μm.

27. A thin film magnetic head according to claim 20, wherein the organic insulation underlying layer is made of a resist or polyimide.

28. A thin film magnetic head according to claim 20, wherein the thickness of the organic insulation underlying layer is in the range of 0.2 μm to 1.0 μm.

29. A thin film magnetic head according to claim 20, wherein the gap between the lower core layer and the coil layer is in the range of 0.35 μm to 1.5 μm.

30. A thin film magnetic head according to claim 20, wherein the upper surfaces of the coil insulation layer and the coil layer are polished surfaces.

31. A thin film magnetic head according to claim 20, wherein the coil insulation layer is made of an inorganic insulating material.

32. A thin film magnetic head according to claim 20, wherein an insulation layer is formed on the coil layer, and a second coil layer is formed on the insulation layer so as to be electrically connected to the coil layer, for inducing a recording magnetic field in the lower core layer, the upper core layer and the recording region.

33. A thin film magnetic head according to claim 20, wherein the recording region comprises a lower pole layer connected directly to the lower core layer and a gap layer formed on the lower pole layer, or a lower pole layer connected directly to the lower core layer, a gap layer formed on the lower pole layer, and an upper pole layer formed on the gap layer.

34. A thin film magnetic head according to claim 33, wherein the gap layer is made of a nonmagnetic metal material which can be plated.

35. A thin film magnetic head according to claim 34, wherein as the nonmagnetic metal material, at least one material is selected from NiP, NiPd, NiW, NiMo, Au, Pt, Rh, Pd, Ru, Cr, and NiCu.

36. A thin film magnetic head according to claim 20, wherein the recording region comprises a gap layer formed on the lower core layer and an upper pole layer formed on the gap layer, or a gap layer which is formed on a protrusion formed integrally with the lower core layer to project toward the upper core layer and an upper pole layer formed on the gap layer.

37. A thin film magnetic head according to claim 36, wherein the gap layer is made of an inorganic insulating material.

38. A thin film magnetic head according to claim 36, wherein as the inorganic insulating material, at least one material is preferably selected from $Al_2O_3$, $SiO_2$, SiON, AlN, AlSiN, and AlSiO.

* * * * *

UNITED STATES PATENT AND TRADEMARK OFFICE
CERTIFICATE OF CORRECTION

PATENT NO. : 6,683,750 B2
DATED : January 27, 2004
INVENTOR(S) : Kiyoshi Sato

It is certified that error appears in the above-identified patent and that said Letters Patent is hereby corrected as shown below:

Column 31,
Line 18, delete "iunction" and substitute -- junction -- in its place.

Column 32,
Lime 3, delete "$SiO_3$," and substitute -- $SiO_2$, -- in its place.

Signed and Sealed this

Twenty-ninth Day of June, 2004

JON W. DUDAS
*Acting Director of the United States Patent and Trademark Office*